(12) United States Patent
Nugent

(10) Patent No.: US 7,398,259 B2
(45) Date of Patent: Jul. 8, 2008

(54) TRAINING OF A PHYSICAL NEURAL NETWORK

(75) Inventor: Alex Nugent, Santa Fe, NM (US)

(73) Assignee: KnowmTech, LLC, Albuquerque, NM (US)

( * ) Notice: Subject to any disclaimer, the term of this patent is extended or adjusted under 35 U.S.C. 154(b) by 296 days.

(21) Appl. No.: 10/969,789

(22) Filed: Oct. 21, 2004

(65) Prior Publication Data

US 2006/0036559 A1 Feb. 16, 2006

Related U.S. Application Data

(63) Continuation-in-part of application No. 10/095,273, filed on Mar. 12, 2002, now Pat. No. 6,889,216, and a continuation-in-part of application No. 10/162,524, filed on Jun. 5, 2002, now abandoned, and a continuation-in-part of application No. 10/226,191, filed on Aug. 22, 2002, now abandoned, and a continuation-in-part of application No. 10/748,546, filed on Dec. 30, 2003, and a continuation-in-part of application No. 10/748,631, filed on Dec. 30, 2003, and a continuation-in-part of application No. 10/730,708, filed on Dec. 8, 2003, now abandoned.

(51) Int. Cl.
*G06N 3/06* (2006.01)

(52) U.S. Cl. .............................. 706/33; 706/15; 706/26; 977/700; 977/712; 977/720; 977/724; 977/742

(58) Field of Classification Search ...................... 706/6, 706/10, 12–16, 25–27, 33, 921
See application file for complete search history.

(56) References Cited

U.S. PATENT DOCUMENTS 2,707,223 A  4/1955  Hollman ................... 338/32 R (Continued)

FOREIGN PATENT DOCUMENTS

| EP | 1 022 764 A1 | 1/2000 |
|----|--------------|--------|
| EP | 1 046 613 A2 | 4/2000 |
| EP | 1 100 106 A2 | 5/2001 |
| EP | 1 069 206 A2 | 7/2001 |
| EP | 1 115 135 A1 | 7/2001 |
| EP | 1 134 304 A2 | 9/2001 |
| RU | 2071126 C1 | 6/1996 |
| WO | WO 00/44094 | 7/2000 |
| WO | WO 03/017282 A1 | 8/2001 |

OTHER PUBLICATIONS

Kevin Gurney, "An Introduction to Neural Networks", 1999, pp. 39,51 and 115.*

(Continued)

*Primary Examiner*—Joseph P. Hirl
*Assistant Examiner*—Omar F Fernandez Rivas
(74) *Attorney, Agent, or Firm*—Kermit D. Lopez; Luis M. Ortiz; Ortiz & Lopez, PLLC

(57) ABSTRACT

Physical neural network systems and methods are disclosed. A physical neural network can be configured utilizing molecular technology, wherein said physical neural network comprises a plurality of molecular conductors, which form neural network connections thereof. A training mechanism can be provided for training said physical neural network to accomplish a particular neural network task based on a neural network training rule. The neural network connections are formed between pre-synaptic and post-synaptic components of said physical neural network. The neural network generally includes dynamic and modifiable connections for adaptive signal processing. The neural network training mechanism can be based, for example, on the Anti-Hebbian and Hebbian (AHAH) rule and/or other plasticity rules.

27 Claims, 16 Drawing Sheets

U.S. PATENT DOCUMENTS

| | | | | |
|---|---|---|---|---|
| 3,222,654 A * | 12/1965 | Widrow et al. | | 365/153 |
| 3,833,894 A | 9/1974 | Aviram et al. | | 365/151 |
| 4,802,951 A | 2/1989 | Clark et al. | | 156/630 |
| 4,926,064 A * | 5/1990 | Tapang | | 706/26 |
| 4,974,146 A | 11/1990 | Works et al. | | 364/200 |
| 4,988,891 A | 1/1991 | Mashiko | | 307/201 |
| 5,315,162 A * | 5/1994 | McHardy et al. | | 706/33 |
| 5,422,983 A | 6/1995 | Castelaz et al. | | 395/24 |
| 5,475,794 A | 12/1995 | Mashiko | | 395/24 |
| 5,589,692 A | 12/1996 | Reed | | 257/23 |
| 5,649,063 A | 7/1997 | Bose | | 395/22 |
| 5,670,818 A | 9/1997 | Forouhi et al. | | 257/530 |
| 5,706,404 A * | 1/1998 | Colak | | 706/33 |
| 5,717,832 A | 2/1998 | Steimle et al. | | 395/24 |
| 5,761,115 A | 6/1998 | Kozicki et al. | | 365/182 |
| 5,783,840 A | 7/1998 | Randall et al. | | 257/24 |
| 5,812,993 A | 9/1998 | Ginosar et al. | | 706/26 |
| 5,896,312 A | 4/1999 | Kozicki et al. | | 365/153 |
| 5,904,545 A | 5/1999 | Smith et al. | | 438/455 |
| 5,914,893 A | 6/1999 | Kozicki et al. | | 365/107 |
| 5,951,881 A | 9/1999 | Rogers et al. | | 216/41 |
| 5,978,782 A | 11/1999 | Neely | | 706/16 |
| 6,026,358 A | 2/2000 | Tomabechi | | 704/232 |
| 6,084,796 A | 7/2000 | Kozicki et al. | | 365/153 |
| 6,128,214 A | 10/2000 | Kuekes et al. | | 365/151 |
| 6,245,630 B1 | 6/2001 | Ishikawa | | 438/393 |
| 6,248,529 B1 | 6/2001 | Connolly | | 435/6 |
| 6,256,767 B1 | 7/2001 | Kuekes et al. | | 716/9 |
| 6,282,530 B1 | 8/2001 | Huang | | 706/41 |
| 6,294,450 B1 | 9/2001 | Chen et al. | | 438/597 |
| 6,314,019 B1 | 11/2001 | Kuekes et al. | | 365/151 |
| 6,330,553 B1 | 12/2001 | Uchikawa et al. | | 706/2 |
| 6,335,291 B1 | 1/2002 | Freeman | | 438/706 |
| 6,339,227 B1 | 1/2002 | Ellenbogen | | 257/40 |
| 6,359,288 B1 | 3/2002 | Ying et al. | | 257/14 |
| 6,363,369 B1 * | 3/2002 | Liaw et al. | | 706/15 |
| 6,383,923 B1 | 5/2002 | Brown et al. | | 438/666 |
| 6,389,404 B1 | 5/2002 | Carson et al. | | 706/18 |
| 6,407,443 B2 | 6/2002 | Chen et al. | | 257/616 |
| 6,418,423 B1 | 7/2002 | Kambhatla et al. | | 706/15 |
| 6,420,092 B1 | 7/2002 | Yang et al. | | 430/311 |
| 6,422,450 B1 | 7/2002 | Zhou et al. | | 228/121.85 |
| 6,423,583 B1 | 7/2002 | Avouris et al. | | 438/132 |
| 6,424,961 B1 | 7/2002 | Ayala | | 706/25 |
| 6,426,134 B1 | 7/2002 | Lavin et al. | | 428/300.1 |
| 6,445,006 B1 * | 9/2002 | Brandes et al. | | 257/76 |
| 6,536,106 B1 * | 3/2003 | Jackson et al. | | 29/872 |
| 6,620,346 B1 | 9/2003 | Schulz et al. | | 252/519.51 |
| 6,798,692 B2 | 9/2004 | Kozicki et al. | | 365/174 |
| 6,855,329 B1 | 2/2005 | Shakesheff et al. | | 424/409 |
| 2001/0004471 A1 | 6/2001 | Zhang | | 427/372.2 |
| 2001/0023986 A1 | 9/2001 | Mancevski | | 257/741 |
| 2001/0024633 A1 | 9/2001 | Lee et al. | | 423/447.3 |
| 2001/0031900 A1 | 10/2001 | Margrave et al. | | 570/126 |
| 2001/0041160 A1 | 11/2001 | Margrave et al. | | 423/440 |
| 2001/0044114 A1 | 11/2001 | Connolly | | 435/6 |
| 2002/0001905 A1 | 1/2002 | Choi et al. | | 438/268 |
| 2002/0004028 A1 | 1/2002 | Margrave et al. | | 423/447.3 |
| 2002/0004136 A1 | 1/2002 | Gao et al. | | 428/367 |
| 2002/0030205 A1 | 3/2002 | Varshavsky | | 257/208 |
| 2002/0075126 A1 | 6/2002 | Reitz et al. | | 338/21 |
| 2002/0090468 A1 | 6/2002 | Goto et al. | | 427/580 |
| 2002/0086124 A1 | 7/2002 | Margrave et al. | | 428/36.9 |
| 2002/0102353 A1 | 8/2002 | Mauthner et al. | | 427/255.28 |
| 2003/0031438 A1 | 2/2003 | Kambe et al. | | 385/122 |
| 2003/0177450 A1 | 9/2003 | Nugent | | 716/1 |
| 2003/0236760 A1 | 12/2003 | Nugent | | 706/26 |
| 2004/0039717 A1 | 2/2004 | Nugent | | 706/27 |
| 2004/0150010 A1 | 8/2004 | Snider | | 257/209 |
| 2004/0153426 A1 | 8/2004 | Nugent | | 706/25 |
| 2004/0162796 A1 | 8/2004 | Nugent | | 706/27 |
| 2004/0193558 A1 | 9/2004 | Nugent | | 706/25 |

OTHER PUBLICATIONS

Ellenbogen et al., "Architecture for Molecular Electronic Computers: 1. Logic Structures and an Adder Design from Molecular Electronic Diodes", 2000, pp. 386-426.*

Bégin et al. "Categorization in Unsupervised Neural Networks: The Eidos Mode" 1996, pp. 147-154.*

Ellenbogen et al., "Architecture for Molecular Electronic Computers: 1 Logic Structures and an , ~dderDesign from Molecular Electronic Diodes", 2000, pp. 386-426.*

*Nanoparticles Get Wired*, Dimes Institute, Delft University of Technology, 1997.

A. Bezryadin, *Trapping Single Particle with Nanoelectrodes*, Physics News Graphics, Sep. 1997.

Snow, et al., *Nanofabrication with Proximal Probes*, Proceedings of the IEEE, Apr. 1997.

P. O'Connor, G. Gramegna, P. Rehak, F. Corsi, C. Marzocca, *CMOS Preamplifier with High Linearity and Ultra Low Noise for X-Ray. Spectroscopy*, IEEE Transactions on Nuclear Science, vol. 44, No. 3, Jun. 1997, pp. 318-325.

Peter Weiss, "Circuitry in a Nanowire: Novel Growth Method May Transform Chips," Science News Online, vol. 161, No. 6; Feb. 9, 2002.

Press Release, "Nanowire-based electronics and optics comes one step closer," Eureka Alert, American Chemical Society; Feb. 1, 2002.

Weeks et al., "High-pressure nanolithography using low-energy electrons from a scanning tunneling microscope," Institute of Physics Publishing, Nanotechnology 13 (2002), pp. 38-42; Dec. 12, 2001.

CMP Cientifica, "Nanotech: the tiny revolution"; CMP Cientifica, Nov. 2001.

Diehl, et al., "Self-Assembled, Deterministic Carbon Nanotube Wiring Networks," Angew. Chem. Int. Ed. 2002, 41, No. 2; Received Oct. 22, 2001.

G. Pirio, et al., "Fabrication and electrical characteristics of carbon nanotube field emission microcathodes with an integrated gate electrode," Institute of Physics Publishing, Nanotechnology 13 (2002), pp. 1-4, Oct. 2, 2001.

Leslie Smith, "An introduction to Neural Networks," Center for Cognitive and Computational Neuroscience, Dept. of Computing & Mathematics, University of Stirling, Oct. 25, 1996; http//www.cs.stir.ac.uk/~lss/NNIntro/InvSlides.html.

V. Derycke et al., "Carbon Nanotube Inter- and Intramolecular Logic Gates," American Chemical Society, Nano Letters, XXXX, vol. 0, No. 0, A-D.

Mark K. Anderson, "Mega Steps Toward the Nanochip," Wired News, Apr. 27, 2001.

Collins et al., "Engineering Carbon Nanotubes and Nanotube Circuits Using Electrical Breakdown," Science, vol. 292, pp. 706-709, Apr. 27, 2001.

Landman et al., "Metal-Semiconductor Nanocontacts: Silicon Nanowires," Physical Review Letters, vol. 85, No. 9, Aug. 28, 2000.

John G. Spooner, "Tiny tubes mean big chip advances," Cnet News.com, Tech News First, Apr. 26, 2001.

Jeong-Mi Moon et al., "High-Yield Purification Process of Singlewalled Carbon Nanotubes," J. Phys. Chem. B 2001, 105, pp. 5677-5681.

"A New Class of Nanostructure: Semiconducting Nanobelts Offer Potential for Nanosensors and Nanoelectronics," Mar. 12, 2001, http://www.sciencedaily.com/releases/2001/03/010309080953.htm.

Hermanson et al., "Dielectrophoretic Assembly of Electrically Functional Microwires from Nanoparticle Suspensions," Materials Science, vol. 294, No. 5544, Issue of Nov. 2, 2001, pp. 1082-1086.

Press Release, "Toshiba Demonstrates Operation of Single-Electron Transistor Circuit at Room Temperature," Toshiba, Jan. 10, 2001.

J. Appenzeller et al., "Optimized contact configuration for the study of transport phenomena in ropes of single-wall carbon nanotubes," Applied Physics Letters, vol. 78, No. 21, pp. 3313-3315, May 21, 2001.

David Rotman, "Molecular Memory, Replacing silicon with organic molecules could mean tiny supercomputers," Technology Review, May 2001, p. 46.

Westervelt et al., "Molecular Electronics," NSF Functional Nanostructures Grant 9871810, NSF Partnership in Nanotechnology Conference, Jan. 29-30, 2001; http://www.unix.oit.umass.edu/~nano/NewFiles/FN19_Harvard.pdf.

Niyogi et al., "Chromatographic Purification of Soluble Single-Walled Carbon Nanotubes (s-SWNTSs)," J. Am. Chem. Soc 2001, 123, pp. 733-734, Received Jul. 10, 2000.

Duan et al., "Indium phosphide nanowires as building blocks for nanoscale electronic and optoelectronic devices," Nature, vol. 409, Jan. 4, 2001, pp. 67-69.

Paulson, et al., "Tunable Resistance of a Carbon Nanotube-Graphite Interface," Science, vol. 290, Dec. 1, 2000, pp. 1742-1744.

Wei et al., "Reliability and current carrying capacity of carbon nanotubes," Applied Physics Letters, vol. 79, No. 8, Aug. 20, 2001, pp. 1172-1174.

Collins et al., "Nanotubes for Electronics," Scientific American, Dec. 2000, pp. 62-69.

Avouris et al., "Carbon nanotubes: nanomechanics, manipulation, and electronic devices," Applied Surface Science 141 (1999), pp. 201-209.

Smith et al., "Electric-field assisted assembly and alignment of metallic nanowires," Applied Physics Letters, vol. 77, No. 9, Aug. 28, 2000, pp. 1399-1401.

Hone et al., "Electrical and thermal transport properties of magnetically aligned single wall carbon nanotube films," Applied Physics Letters, vol. 77, No. 5, Jul. 31, 2000, pp. 666-668.

Smith et al., "Structural anisotropy of magnetically aligned single wall carbon nanotube films," Applied Physics Letters, vol. 77, No. 5, Jul. 31, 2000, pp. 663-665.

Andriotis et al., "Various bonding configurations of transition-metal atoms on carbon nanotubes: Their effect on contact resistance," Applied Physics Letters, vol. 76, No. 26, Jun. 2000, pp. 3890-3892.

Chen et al., "Aligning single-wall carbon nanotubes with an alternating-current electric field," Applied Physics Letters, vol. 78, No. 23, Jun. 4, 2001, pp. 3714-3716.

Bezryadin et al., "Self-assembled chains of graphitized carbon nanoparticles, " Applied Physics Letters, vol. 74, No. 18, May 3, 1999, pp. 2699-2701.

Bezryadin et al., "Evolution of avalanche conducting states in electrorheological liquids," Physical Review E, vol. 59, No. 6, Jun. 1999, pp. 6896-6901.

Liu et al., "Fullerene Pipes," Science, vol. 280, May 22, 1998, pp. 1253-1255.

Yamamoto et al., "Orientation and purification of carbon nanotubes using ac electrophoresis," J. Phys. D: Appl. Phys 31 (1998) L34-L36.

Bandow et al., "Purification of Single-Wall Carbon Nanotubes by Microfiltration," J. Phys. Chem. B 1997, 101, pp. 8839-8842.

Tohji et al., "Purifying single walled nanotubes," Nature, vol. 383, Oct. 24, 1996, p. 679.

Dejan Rakovic, "Hierarchical Neural Networks and Brainwaves: Towards a Theory of Consciousness," Brain & Consciousness: Proc. ECPD Workshop (ECPD, Belgrade, 1997), pp. 189-204.

Dave Anderson & George McNeill, "Artificial Neural Networks Technology," A DACS (Data & Analysis Center for Software) State-of-the-Art Report, Contact No. F30602-89-C-0082, ELIN: A011, Rome Laboratory RL/C3C, Griffiss Air Force Base, New York, Aug. 20, 1992.

Greg Mitchell, "Sub-50 nm Device Fabrication Strategies," Project No. 890-00, Cornell Nanofabrication Facility, Electronics—p. 90-91, National Nanofabrication Users Network.

John-William DeClaris, "An Introduction to Neural Networks," http://www.ee.umd.edu/medlab/neural/nn1.html.

"Neural Networks," StatSoft, Inc., http://www.statsoftinc.com/textbook/stevnet.html.

Stephen Jones, "Neural Networks and the Computation Brain or Maters relating to Artificial Intelligence," The Brain Project, http://www.culture.com.au/brain_proj/neur_net.htm.

David W. Clark, "An Introduction to Neural Networks"; http://members.home.net/neuralnet/introtonn/index.htm.

"A Basic Introduction to Neural Networks"; http://blizzard.gis.uiuc.edu/htmldocs/Neural/neural.html.

Meyer et al., "Computational neural networks: a general purpose tool for nanotechnology," Abstract, 5th Foresight Conference on Molecular Nanotechnology; http://www.foresight.org/Conferences/MNT05/Abstracts/Meyeabst.html.

Saito et al., "A 1M Synapse Self-Learning Digital Neural Network Chip," ISSCC, pp. 6.5-1 to 6.5-10, IEEE 1998.

Espejo, et al., "A 16 x 16 Cellular Neural Network Chip for Connected Component Detection," Jun. 30, 1999; http://www.imse.cnm.csic.es/Chipcat/espejo/chip-2.pdf.

Pati et al., "Neural Networks for Tactile Perception," Systems Research Center and Dept. of Electrical Engineering, University of Maryland and U.S. Naval Research Laboratory. 1987; http://www.isr.umd.edu/TechReports/ISR/1987/TR_87-123/TR_87-123.phtml.

Osamu Fujita, "Statistical estimation of the number of hidden units for feedforward neural networks," Neural Networks 11 (1998), pp. 851-859.

Abraham Harte, "Liquid Crystals Allow Large-Scale Alignment of Carbon Nanotubes," CURJ (Caltech Undergraduate Research Journal), Nov. 2001, vol. 1, No. 2, pp. 44-49.

"Quantum-Dot Arrays for Computation," ORNL Review vol. 34, No. 2, 2001, pp. 1-5 http://www.ornlgov/ORNLReview/v34_2_01/arrays.htm.

Jabri, M.A. et al., "Adaptive Analog VLSI Neural Systems," Chapman & Hall, London SE1 8HN, UK, 1996, pp. 92-95.

Lipson et al., "Automatic Design and Manufacture of Robotic Lifeforms," Nature, vol. 406, Aug. 31, 2000, pp. 974-978.

A. Bezryadin, et al., "Evolution of Avalanche Conducting States in Electrorheological Liquids," The America Physical Society, Jun. 1999, vol. 59, No. 6, pp. 6896-6901.

Kunitoshi Yamamoto, et al., "Rapid Communication Orientation and Purification of Carbon Nanotubes Using AC Electrophoresis", J. Phys. D. Appl. Phys 31 (1998) L34-L36.

E.S. Snow, et al., "Random networks of carbon nanotubes as electronic material", Applied Physics Letters, vol. 82, No. 12, Mar. 31, 2003, pp. 2145-2147.

R. Martel, et al., "Ambipolar Electrical Transport in Semiconducting Single-Wall Carbon Nanotubes," Physical Review Letters, vol. 87, No. 25, Dec. 17, 2001, pp. 256805-1 to 256805-4.

S. Heinze, et al., "Carbon Nanotubes as Schottky Barrier Transistors", vol. 89, No. 10, Sep. 2, 2002, pp. 106801-1 to 106801-4.

M. Dubson, et al., "Measurement of the conductivity exponent in two-dimensional percolating networks: square lattice versus random-void continuum", Physical Review B, vol. 32, No. 11, Dec. 1, 1985, pp. 7621-7623.

D.J. Frank, et al., "Highly efficient algorithm for percolative transport studies in two dimensions", Physical Review B, vol. 37, No. 1, Jan. 1, 1998, pp. 302-307.

Uma R. Karmarkar, et al., "Mechanisms and significance of spike-timing dependent plasticity," Biol. Cybern. 87, 373-382 (2002), Jan. 28, 2002.

Uma R. Karmarkar, et al., "A Model of Spike-Timing Dependent Plasticity: One or Two Coincidence Detectors?", J. Neurophysiol, vol. 88, pp. 507-513, Jul. 2002.

M.C.W. van Rossum, et al., "Stable Hebbian Learning from Spkke-Timing-Dependent Plasticity", The Journal of Neuroscience, Dec. 1, 2003, 20(23), pp. 8812-8821.

Xiaohul Xie, et al., "Spike-based learning rules and stabilization of persistent neural activity,".

Nace L. Golding, et al., "Dendritic spikes as a mechanism for cooperative long-term potentiation", NATURE, vol. 418, Jul. 18, 2002, pp. 326-330.

Ozgur Turel, et al., "Possible nanoelectronic implementation of neuromorphic networks", Dept. o f Physics and Astronomy, Stony Brook University.

V.C. Moore, et al., "Individually Suspended Single-Walled Carbon Nanotubes in Various Surfactants," Nano Letters, 2003, vol. 3; Sep. 9, 2003; American Chemical Society, pp. 1379-1382.

A. Leonardi, et al., "Simulation methodology for dielectrophoresis in microelectronic Lab-on-a-chip," Modeling and Simulation of Microsystems 2002, pp. 96-99.

J. Chung, et al., "Nanoscale Gap Fabrication and Integration of Carbon Nanotubes by Micromachining," Solid-State Sensor, Actuator and Microsystems Workshop, Jun. 2-6, 20031 Hilton Head Island, South Carolina, pp. 161-164.

L. Zheng, et al., "Towards Single Molecule Manipulation with Dielectrophoresis Using Nanoelectrodes," IEEE-NANO 2003, Aug. 12-14, 2003, Moscone Convention Center, San Francisco, CA; pp. 437-440, hhtp://ieeenano2003.arc.nasa.gov/program_contents.pdf.

A. van Schaik, "Building blocks for electronic spiking neural networks," Neural Networks 14 (2001), pp. 617-628.

V.C. Moore, et al., "Individually Suspended Single-Walled Carbon Nanotubes in Various Surfactants," Nano Letters, 2003, vol. 3, No. 10; American Chemical Society; Sep. 8, 2003; pp. 1379-1382.

R. Krupke, "Separation of Metallic from Semiconducting Single-Walled Carbon Nanotubes," Science, vol. 301; Jul. 18, 2003; pp. 344-347.

Wolfgang Maass, "On the Relevance of Time in Neural Computation and Learning," In M. Li and A. Maruoka, editors, *Proc. of the 8th International Conference on Algorithmic Learning Theory in Sendai (Japan)*, vol. 1316 of *Lecture Notes in Computer Science*, pp. 364-388, Springer (Berlin), 1997.

Wolfgang Maass, "Noisy Spiking Neurons with Temporal Coding have more Computational Power than Sigmoidal Neurons," In M. Mozer, M. I. Jordan, and T. Petsche, editors, *Advances in Neural Information Processing Systems*, vol. 9, pp. 211-217. MIT Press (Cambridge), 1997. (pp. 1-13, including Appendix).

L. Perrinet, et al., "Emergence of filters from natural scences in a sparse spike coding scheme," Neurocomputing, 2003, pp. 1-14, http://www.laurent.perrinet.free.fr/publi/perrinet03neurocomputing.pdf.

L. Perrinet, et al., "Coherence detection in a spiking neuron via Hebbian learning," Neurocomputing, 2002, vol. 44-46, No. C., pp. 817-822, http://www.laurent.perrinet.free.fr/publi/perrine02.pdf.

A. Jarosz, et al., "An Introductory Note on Gaussian Correlated Random Matrix," Feb. 21, 2003, pp. 1-20 http://www.if.uj.edu.pl/pl/koloSMP/prace/rndmatrix.pdf.

K. Bradley, et al., "Influence of Mobile Ions on Nanotube Based FET Devices," Nano Letters, 2003, vol. 3, No. 5; American Chemical Society, Apr. 4, 2003; pp. 639-641.

A. van Schaik, "Building blocks for electronic spiking neural networks," Neural Networks 14 (2001), pp. 617-628.

Leslie Smith, "An Introduction to Neural Networks," Center for Cognitive and Computational Neuroscience, Dept. of Computing & Mathematics, University of Stirling, Oct. 25, 1996.

V. Derycke et al., "Carbon Nanotube Inter- and Intramolecular Logic Gates," American Chemical Society, Nano.

"A New Class of Nanostructure: Semiconducting Nanobelts Offer Potential for Nanosensors and Nanoelectronics," Mar. 12, 2001.

Westervelt et al., "Molecular Electronics," NSF Functional Nanostructures Grant 9871810, NSF Partnership in Nanotechnology Conference, Jan. 29-30, 2001.

John-William DeClaris, "An Introduction to Neural Networks,".

"Neural Networks," StatSoft, Inc.

Stephen Jones, "Neural Networks and the Computation Brain or Maters relating to Artificial Intelligence," The Brain Project.

David W. Clark, "An Introduction to Neural Networks".

"A Basic Introduction to Neural Networks".

Meyer et al., "Computational neural networks: a general purpose tool for nanotechnology," Abstract, 5th Foresight Conference on Molecular Nanotechnology.

Espejo, et al., "A 16 x 16 Cellular Neural Network Chip for Connected Component Detection," Jun. 30, 1999.

Pati et al., "Neural Networks for Tactile Perception," Systems Research Center and Dept. of Electrical Engineering, University of Maryland and U.S Naval Research Laboratory. 1987.

"Quantum-Dot Arrays for Computation," ORNL Review vol. 34, No. 2, 2001, pp. 1-5.

Xiaohui Xie, et al., "Spike-based learning rules and stabilization of persistent neural activity,".

L. Perrinet, et al., "Emergence of filters from natural scences in a sparse spike coding scheme," Neurocomputing, 2003, pp. 1-14.

L. Perrinet, et al., "Coherence detection in a spiking neuron via Hebbian Learning," Neurocomputing, 2002, vol. 44-46, No. C., pp. 817-822.

A. Jarosz, et al., "An Introductory Note on Gaussian Correlated Random Matrix," Feb. 21, 2003, pp. 1-20.

"Solid-State thin-film memistor for electronic neural networks", S Thakoor, A. Moopann, T. Daud, and A.P. Thakoor, Journal of Applied Physics—Mar. 15, 1990—vol. 67, Issue 6, pp. 3132-3135.

"Computational nanotechnology with carbon nanotubes and fullemes", Srivastava, D. Menon M. Kyeongjae Cho. NASA Ames Res. Center, Moffett Field, CA, Computing in Science & Engineering, Jul./Aug. 2001. vol. 3, Issue 4, pp. 42-55.

* cited by examiner

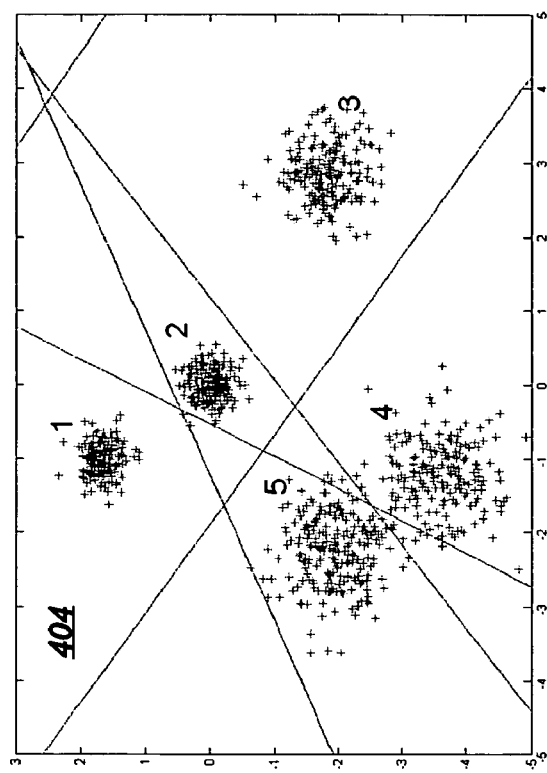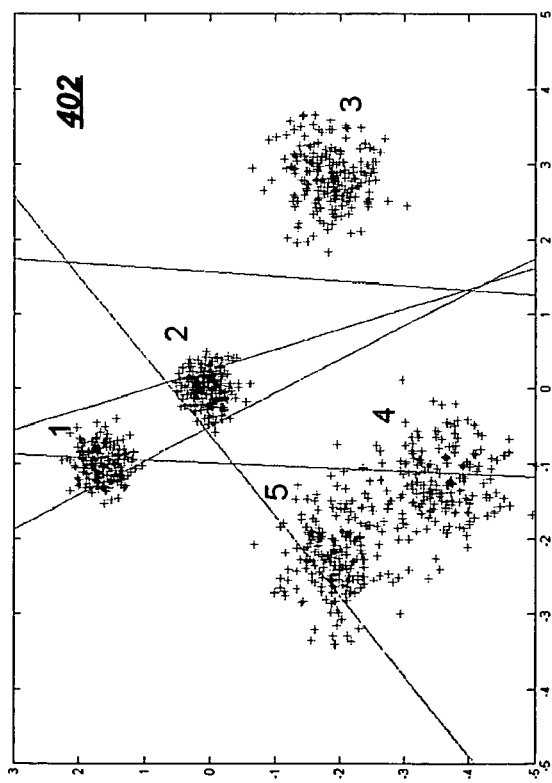
FIG. 4

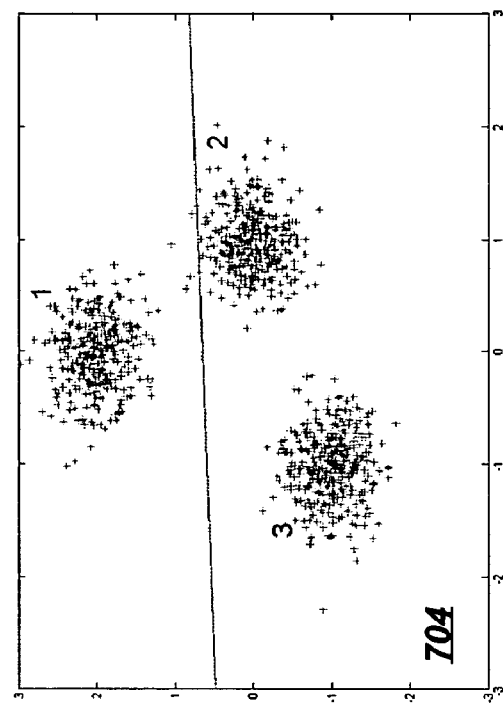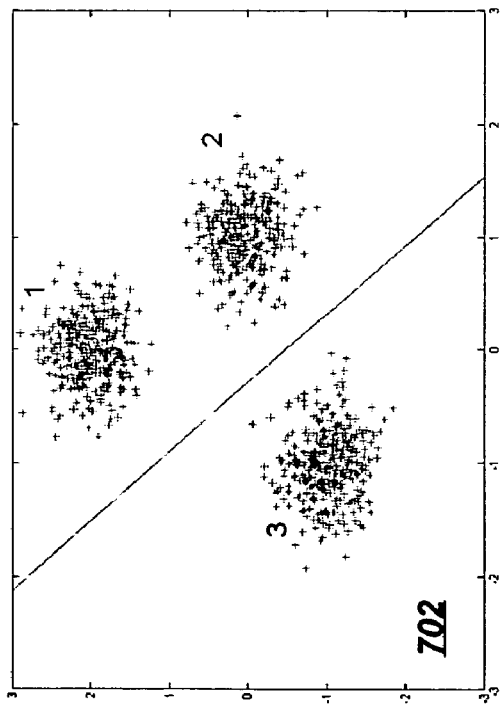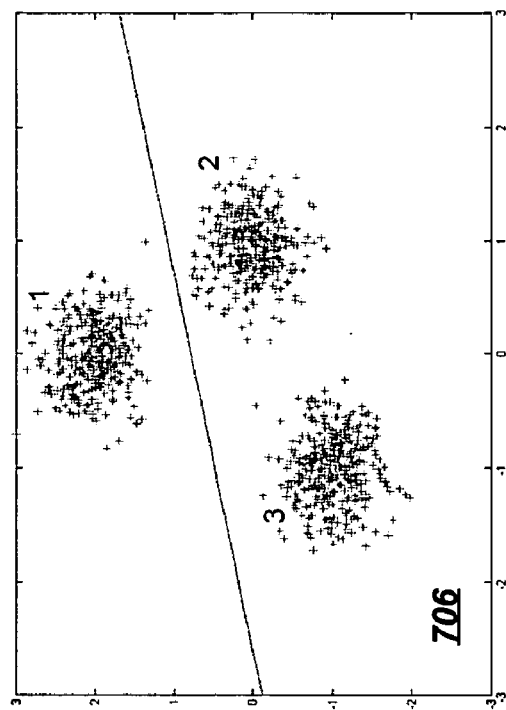
FIG. 7

TRAINING OF A PHYSICAL NEURAL NETWORK

CROSS-REFERENCE TO RELATED APPLICATIONS

This patent application is a continuation-in-part of U.S. patent application Ser. No. 10/095,273, "Physical Neural Network Design Incorporating Nanotechnology," which was filed on Mar. 12, 2002 now U.S. Pat. No. 6,889,216, the disclosure of which is incorporated herein by reference. This patent application is also a continuation-in-part of U.S. patent application Ser. No. 10/162,524, "Multi-Layer Training in a Physical Neural Network Formed Utilizing Nanotechnology," which was filed on Jun. 5, 2002 now abandoned, the disclosure of which is incorporated herein by reference. This patent application is additionally a continuation-in-part of U.S. patent application Ser. No. 10/226,191, "High-Density Synapse Chip Using Nanoparticles," which was filed on Aug. 22, 2002 now abandoned, the disclosure of which is incorporated herein by reference. This patent application is also a continuation-in-part of U.S. patent application Ser. No. 10/748,546, "Physical Neural Network Liquid State Machine Utilizing Nanotechnology," which was filed on Dec. 30, 2003, the disclosure of which is incorporated herein by reference. This patent application is also a continuation-in-part of U.S. patent application Ser. No.10/748,631, "Application of Hebbian and Anti-Hebbian Learning to Nanotechnology-Based Physical Neural Networks," which was filed on Dec. 30, 2003, the disclosure of which is incorporated herein by reference. This patent application is also a continuation-in-part of U.S. patent application Ser. No. 10/730,708, "Adaptive Neural Network Utilizing Nanotechnology-Based Components," which was filed on Dec. 8, 2003 now abandoned, the disclosure of which is incorporated herein by reference.

TECHNICAL FIELD

Embodiments generally relate to molecular technology, such as, for example, nanotechnology. Embodiments also relate to neural networks and neural computing systems and teaching methods thereof. Embodiments are additionally related to plasticity rules and training rules, such as, for example Anti-Hebbian and Hebbian rules.

BACKGROUND OF THE INVENTION

Neural networks are computational systems that permit computers to essentially function in a manner analogous to that of the human brain. Neural networks do not utilize the traditional digital model of manipulating 0's and 1's. Instead, neural networks create connections between processing elements, which are equivalent to neurons of a human brain. Neural networks are thus based on various electronic circuits that are modeled on human nerve cells (i.e., neurons).

Generally, a neural network is an information-processing network, which is inspired by the manner in which a human brain performs a particular task or function of interest. Computational or artificial neural networks are thus inspired by biological neural systems. The elementary building blocks of biological neural systems are the neuron, the modifiable connections between the neurons, and the topology of the network.

Biologically inspired artificial neural networks have opened up new possibilities to apply computation to areas that were previously thought to be the exclusive domain of human intelligence. Neural networks learn and remember in ways that resemble human processes. Areas that show the greatest promise for neural networks, such as pattern classification tasks, speech and image recognition are areas where conventional computers and data-processing systems have had the greatest difficulty.

In general, artificial neural networks are systems composed of many nonlinear computational elements operating in parallel and arranged in patterns reminiscent of biological neural nets. The computational elements, or nodes, are connected via variable weights that are typically adapted during use to improve performance. Thus, in solving a problem, neural net models can explore many competing hypothesis simultaneously using massively parallel nets composed of many computational elements connected by links with variable weights.

In contrast, with conventional von Neumann computers, an algorithm must first be developed manually, and a program of instructions written and executed sequentially. In some applications, this has proved extremely difficult. This makes conventional computers unsuitable for many real-time problems for which no efficient algorithm is presently available.

In a neural network, "neuron-like" nodes can output a signal based on the sum of their inputs, the output being the result of an activation function. In a neural network, there exists a plurality of connections, which are electrically coupled among a plurality of neurons. The connections serve as communication bridges among of a plurality of neurons coupled thereto. A network of such neuron-like nodes has the ability to process information in a variety of useful ways. By adjusting the connection values between neurons in a network, one can match certain inputs with desired outputs.

One does not program a neural network. Instead, one "teaches" a neural network by examples. Of course, there are many variations. For instance, some networks do not require examples and extract information directly from the input data. The two variations are thus called supervised and unsupervised learning. Neural networks are currently used in applications such as noise filtering, face and voice recognition and pattern recognition. Neural networks can thus be utilized as an advanced technique for processing information.

Neural networks that have been developed to date are largely software-based. A true neural network (e.g., the human brain) is massively parallel (and therefore very fast computationally) and very adaptable. For example, half of a human brain can suffer a lesion early in its development and not seriously affect its performance. Software simulations are slow because during the learning phase a standard computer must serially calculate connection strengths. When the networks get larger (and therefore more powerful and useful), the computational time becomes enormous.

For example, networks with 10,000 connections can easily overwhelm a computer. In comparison, the human brain has about 100 billion neurons, each of which can be connected to about 5,000 other neurons. On the other hand, if a network is trained to perform a specific task, perhaps taking many days or months to train, the final useful result can be built or "downloaded" onto a piece of hardware and also mass-produced. Because most problems requiring complex pattern recognition are highly specific, networks are task-specific. Thus, users usually provide their own, task-specific training data.

A number of software simulations of neural networks have been developed. Because software simulations are performed on conventional sequential computers, however, they do not take advantage of the inherent parallelism of neural network architectures. Consequently, they are relatively slow. One frequently used measurement of the speed of a neural network processor is the number of interconnections it can perform per second.

For example, the fastest software simulations available can perform up to approximately 18 million interconnects per second. Such speeds, however, currently require expensive super computers to achieve. Even so, approximately 18 million interconnects per second is still too slow to perform many classes of pattern classification tasks in real time. These include radar target classifications, sonar target classification, automatic speaker identification, automatic speech recognition, electrocardiogram analysis, etc.

The implementation of neural network systems has lagged somewhat behind their theoretical potential due to the difficulties in building neural network hardware. This is primarily because of the large numbers of neurons and weighted connections required. The emulation of even of the simplest biological nervous systems would require neurons and connections numbering in the millions and/or billions.

Due to the difficulties in constructing such highly interconnected processors, currently available neural network hardware systems have not approached this level of complexity. Another disadvantage of hardware systems is that they typically are often custom designed and configured to implement one particular neural network architecture and are not easily, if at all, reconfigurable in implementing different architectures. A true physical neural network chip, with the learning abilities and connectivity of a biological network, has not yet been designed and successfully implemented.

The problem with a pure hardware implementation of a neural network utilizing existing technology is the inability to physically form a great number of connections and neurons. On-chip learning can exist, but the size of the network is limited by digital processing methods and associated electronic circuitry. One of the difficulties in creating true physical neural networks lies in the highly complex manner in which a physical neural network must be designed and constructed. It is believed that solutions to creating a true physical and artificial neural network lie in the use of nanotechnology and the implementation of a novel form of variable connections.

The term "Nanotechnology" generally refers to nanometer-scale manufacturing processes, materials and devices, as associated with, for example, nanometer-scale lithography and nanometer-scale information storage. Nanometer-scale components find utility in a wide variety of fields, particularly in the fabrication of micro-electrical and micro-electromechanical systems (commonly referred to as "MEMS"). Micro-electrical nano-sized components include transistors, resistors, capacitors and other nano-integrated circuit components. MEMS devices include, for example, micro-sensors, micro-actuators, micro-instruments, micro-optics, and the like.

In general, nanotechnology presents a solution to the problems faced in the rapid pace of computer chip design in recent years. According to Moore's law, the number of switches that can be produced on a computer chip has doubled every 18 months. Chips now can hold millions of transistors. It is, becoming increasingly difficult, however, to increase the number of elements on a chip utilizing existing technologies. At the present rate, in the next few years the theoretical limit of silicon-based chips will likely have been attained. Because the number of elements and components that can be manufactured on a chip determines the data storage and processing capabilities of microchips, new technologies are required for the development of higher performance integrated circuit chips.

Present chip technology is also limited in cases where wires must be crossed on a chip. For the most part, the design of a computer chip is limited to two dimensions. Each time a circuit is forced to cross another circuit, another layer must be added to the chip. This increases the cost and decreases the speed of the resulting chip. A number of alternatives to standard silicon based complementary metal oxide semiconductor ("CMOS") devices have been proposed. The common goal is to produce logic devices on a nanometer scale. Such dimensions are more commonly associated with molecules than integrated circuits.

The issue of interconnects in neural network hardware poses a serious problem. Because of the massive interconnectivity, a neural network constructed with standard integrated electronic methods can never reach the desired neuron and synapse density, simply because the interconnections overwhelm the largely 2-diminsional chip. It can thus be appreciated that almost any sort of 3-diminsional connectivity, no matter how simple, can offer tremendous benefits.

Integrated circuits and electrical components thereof, which can be produced at a molecular and nanometer scale, include devices such as carbon nanotubes and nanowires, which essentially are nanoscale conductors ("nanoconductors"). Nanoconductors are tiny conductive tubes (i.e., hollow) or wires (i.e., solid) with a very small size scale (e.g., 0.7 to 300 nanometers in diameter and up to 1 mm in length). Their structure and fabrication have been widely reported and are well known in the art. Carbon nanotubes, for example, exhibit a unique atomic arrangement, and possess useful physical properties such as one-dimensional electrical behavior, quantum conductance, and ballistic electron transport.

Carbon nanotubes are among the smallest dimensioned nanotube materials with a generally high aspect ratio and small diameter. High-quality single-walled carbon nanotubes can be grown as randomly oriented, needle-like or spaghetti-like tangled tubules. They can be grown by a number of fabrication methods, including chemical vapor deposition (CVD), laser ablation or electric arc growth.

Carbon nanotubes can be grown on a substrate by catalytic decomposition of hydrocarbon containing precursors such as ethylene, methane, or benzene. Nucleation layers, such as thin coatings of Ni, Co, or Fe are often intentionally added onto the substrate surface in order to nucleate a multiplicity of isolated nanotubes. Carbon nanotubes can also be nucleated and grown on a substrate without a metal nucleating layer by using a precursor including one or more of these metal atoms. Semiconductor nanowires can be grown on substrates by similar processes.

Attempts have been made to construct electronic devices utilizing nano-sized electrical devices and components. For example, a molecular wire crossbar memory device can be constructed from crossbar arrays of nanowires sandwiching molecules that act as on/off switches. Such a device can be formed from a plurality of nanometer-scale devices, each device comprising a junction formed by a pair of crossed wires where a single wire crosses another and at least one connector species connects the pair of crossed wires in the junction. The connector species comprises a bi-stable molecular switch. The junction forms either a resistor or a diode or an asymmetric non-linear resistor. The junction has a state that is capable of being altered by application of a first voltage and sensed by the application of a second, non-destructive voltage. A series of related patents attempts to cover everything from molecular logic to how to chemically assemble these devices.

Such a molecular crossbar device has two general applications. The notion of transistors built from nanotubes and relying on nanotube properties is being pursued. Second, two wires can be selectively brought to a certain voltage and the resulting electrostatic force attracts them. When they touch, the Van der Walls force keeps them in contact with each other and a "bit" is stored. The connections in this apparatus can therefore be utilized for a standard (i.e., binary and serial) computer. The inventors of such a device thus desire to coax a nanoconductor into a binary storage media or a transistor. As it turns out, such a device is easier to utilize as a storage device.

A need exists for a physical neural network, which can be implemented in the context of a semiconductor integrated circuit (i.e., a computer chip). Such a device, which can be referred to as a "physical neural network chip" or a "synapse chip" is thus disclosed herein. Such a device, if successfully implemented would be well suited for use with neural networks.

BRIEF SUMMARY

The following summary is provided to facilitate an understanding of some of the innovative features unique to the embodiments presented herein, and is not intended to be a full description. A full appreciation of the various aspects disclosed herein can be gained by taking the entire specification, claims, drawings, and abstract as a whole.

It is, therefore, one aspect of the present invention to provide for a physical neural network, including an adaptive neural network, which can be formed and implemented utilizing nanotechnology.

It is still another aspect of the present invention to provide a physical neural network, which can be formed from a plurality of interconnected molecular connections, such as, for example, molecules, nanoconnections, and/or nanoconnectors.

It is yet a further aspect of the present invention to provide a physical neural network, which can be formed from a plurality of molecules, including molecular conducting structures.

It a further aspect of the present invention to provide a physical neural network based on nanoconductors, such as, for example, nanowires and/or nanotubes.

It is also an aspect of the present invention to provide a training mechanism for a physical neural network.

It is another aspect of the present invention to provide for a training mechanism for a physical neural network, wherein the training mechanism is based on a plasticity rule.

It is an additional aspect of the present invention to provide for a training mechanism for a physical neural network, wherein the training mechanism is based on the Anti-Hebbian and Hebbian (AHAH) rule.

The above and other aspects can be achieved as will now be described. Physical neural network systems and methods are disclosed herein. A physical neural network can be configured utilizing molecular technology, wherein the physical neural network comprises a plurality of molecular conductors, which form neural network connections thereof. A training mechanism can be provided for training the physical neural network to accomplish a particular neural network task based on a neural network training rule. The neural network connections are formed between pre-synaptic and post-synaptic components of the physical neural network. The neural network dynamic and modifiable connections for adaptive signal processing. The neural network training mechanism can be based, for example, on the Anti-Hebbian and Hebbian (AHAH) rule and/or other plasticity rules.

In configuring the physical neural network, the molecular conductors can be disposed within a solution and can be configured, for example, as nanoparticles suspended in the solution. A mechanism can also be provided for dynamically implementing variable connections from the neural network connections. Such a mechanism can be implemented as a dielectrophoretic assembly of nanoparticles in the solution. The nanoparticles suspended in the solution are subject to a dielectrophoretic force and exposed to time-varying electric fields, wherein the dielectrophoretic force is utilized to attract or repel the nanoparticles to an electrode gap formed between at least one pre-synaptic electrode and at least one post-synaptic electrode of the physical neural network. The nanoparticles suspended in the solution can comprise semi-conducting nanoparticles, and or other nanoparticles such as, for example, carbon nanotubes and/or carbon nanowires.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 4 illustrates data space graphs demonstrating the result of lateral inhibition, where the same initial weight vectors are forced into separate states in accordance with an embodiment of the present invention;

FIG. 7 illustrates a group of graphs demonstrating how one neuron can be moved from a state that divides particular features from one another, in accordance with an embodiment of the present invention;

DETAILED DESCRIPTION OF THE INVENTION

Figure 1:
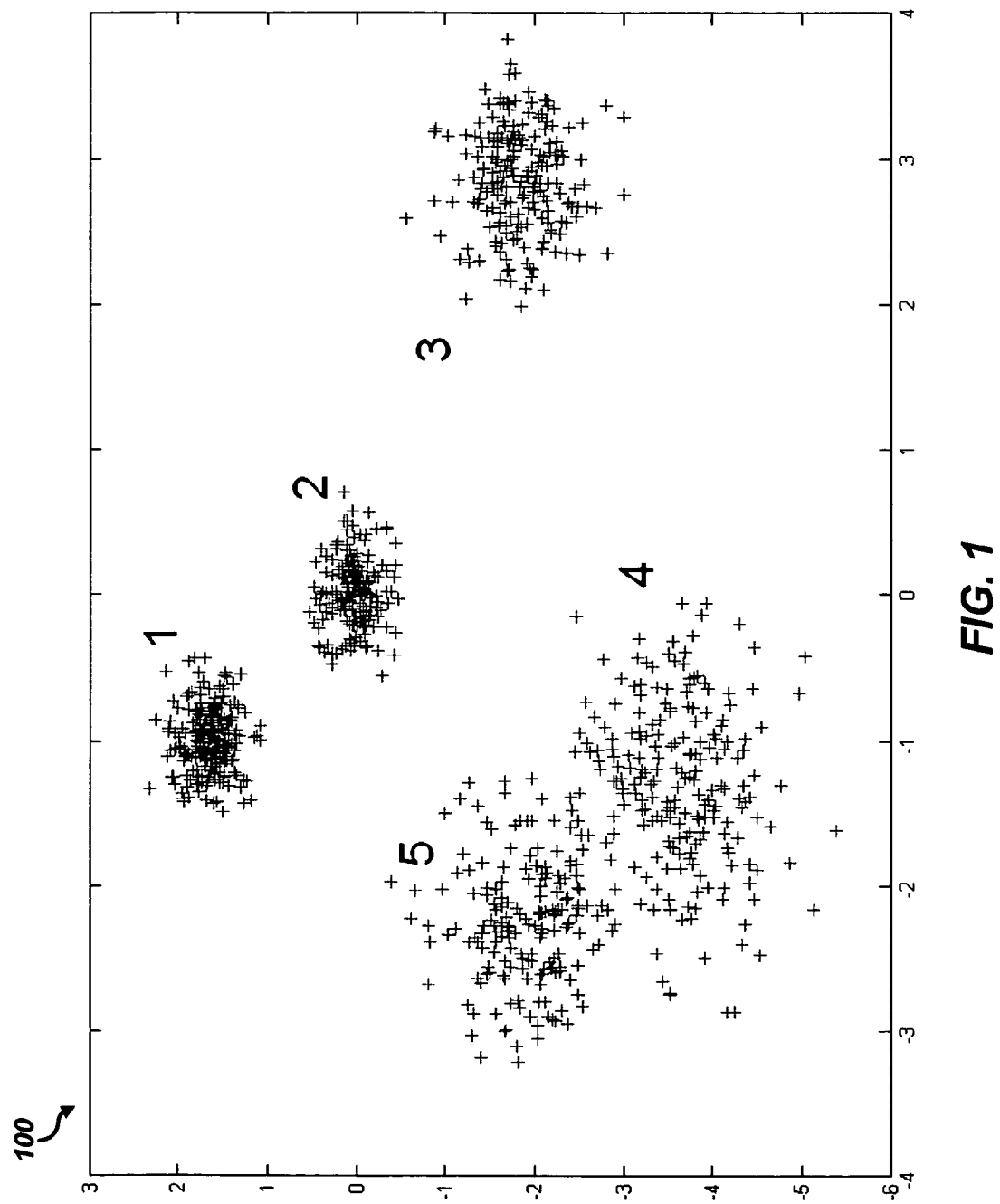
FIG. 1 illustrates a graph of two-dimensional data space, where features can be recognized as clusters of data points in accordance with an embodiment of the present invention.

The particular values and configurations discussed in these non-limiting examples can be varied and are cited merely to illustrate an embodiment of the present invention and are not intended to limit the scope of the invention.

The physical neural network disclosed herein with respect to one or more embodiments can be referred to generically as a Knowm™. The terms "physical neural network" and "Knowm" can thus be utilized interchangeably to refer to the same device, network, or structure. The term "Knowm" can also refer to a semiconductor implementation, such as a physical neural network chip and/or synapse chip. Note that the terms "physical neural network chip" and "synapse chip" can also be utilized herein to refer generally to the same or analogous type of Knowm™ device.

Network orders of magnitude larger than current VSLI neural networks can now be built. One consideration for a Knowm™ is that it must be large enough for its inherent parallelism to shine through. Because the connection strengths of such a physical neural network are dependant on the physical movement of nanoconnections thereof, the rate at which a small network can learn is generally very small and a comparable network simulation on a standard computer can be very fast. On the other hand, as the size of the network increases, the time to train the device does not change. Thus, even if the network takes a full second to change a connection value a small amount, if it does the same to a billion connections simultaneously, then its parallel nature begins to express itself.

A physical neural network (i.e., a Knowm™ enabled physical neural network) generally should possess two basic components to function properly. First, such a physical neural network should have one or more neuron-like nodes that sum a signal and output a signal based on the amount of input signal received. Such a neuron-like node is generally non-linear in output. In other words, there should be a certain threshold for input signals, below which nothing can be output and above which a constant or nearly constant output is generated or allowed to pass. This is considered the basic building block of all neural networks, and can be accomplished by an activation function. The second requirement of a physical neural network is the inclusion of a connection network composed of a plurality of interconnected electrodes (i.e., nanoconnections).

One area, for example, where a Knowm™ connection and or connection network can find usefulness is in human vision. It is known that there is a large blind spot directly to the side of each person's center of vision. This spot is the result of the many neural fibers coalescing and exiting the retina via the optic nerve. Most people are completely oblivious to this significant visual void and are confounded and amazed when it is finally pointed out. It is much the same with the abundance of unsolved problems at the boundary of humans and computers. Unless these unsolved problems are pointed out, they continue largely without notice. The boundary of the real world and the artificial world is located somewhere at this point.

Intelligent Signal Processing (ISP) attempts to address the problems that current technology has been unable to solve. If a problem can be distilled into a clear and sequential mathematical algorithm, the problem can be solved utilizing current computing platforms. Many problems have been solved in this manner; however, these strategies fail as attempts are made to solve distinctly human problems, such as visual recognition. Such human problems require massive amounts of processing "noisy" data. Visual object recognition represents one example where a designer would desire to build a system capable of finding and tracking objects.

The transformation from pixels space to a sparse and very high-level description is a difficult and extremely computationally expensive problem. Consider the example of a visual navigation system. Before any high-level decisions can be made one million or more pixels contained in an image must be taken into consideration in order find objects utilizing such pixels.

Given that it is not always known how to succinctly describe objects that are being "looked at"; algorithms capable of learning to see are required. In other words, an algorithm is needed that takes as its input the pixilated representation of the world and outputs a succinct object-representation. If such algorithms are going to be implemented in a new nano-electronic architecture they must be compatible with the requirements of self-assembly and self-repair.

On the one hand, new nano-electronic structures are available. On the other hand, information processing algorithms can also be utilized. Knowm™ technology thus bridges these fields by offering three distinct advantages. First, the direction is well defined. A specific goal can be set, such as, for example, attempting to solve the problem of object identification in real-world data, rather than a broad generic goal such as constructing a general-purpose computer. Second, a physical process capable of self-assembly and self-repair is identified. Such a process can be implemented as an organizational property of molecules in a dielectric suspension, which represents a new physical property of tremendous value. Third, an algorithm capable of extracting object information in association with a Knowm™ connection network (e.g., physical neural network) can be implemented. In other words, the building blocks for assembling variable pieces into a coherent whole can be utilized to solve problems such as visual object recognition.

Every aspect of human cognitive processes hinges on the ability to identify objects. Only when objects are identified can they be manipulated in order to construct an "answer". Consider the scenario of a "self-driving" car. The rules of driving are seemingly not too difficult; that is, obey the speed limit; do not change lanes unless the road is clear, or alternately avoid obstacles in the road. Such rules are simple and well defined. Carrying out these rules, however, is far from easy. How, for example, would the on-board computer know the current speed limit?

Perhaps radio identification modules can be attached to all current speed limit signs. An on-board receiver can then keep track of the speed limit. Simple enough. What about avoiding other cars? Again, a solution can be envisioned where each car contains a GPS system and a radio transceiver. The position of the car can be broadcast to all other cars, which use this information to control the car. This is still a feasible route to take. But what about the occasional deer that wonders into the road at night, frozen in the headlights? Or even worse, what about a child crossing the street, running after a soccer ball kicked into the road? What about recognizing the road itself? One can see where this line of thought is headed.

The dream of self-driving cars hinges on the ability of the navigation system to possess adequate information about the road. Whereas some information, such as the speed limit, may be converted to a form useable by the on-board navigation system, other information is attainable by no other means but analysis of visual information. Imagine a new type of electronic chip that accomplishes nothing more than convert a constant stream of visual information ('pixels') into a standardized object-representation. The output of such a chip is preferably a compact digital signal where, for example, the presence of a car, along with its varying attributes such as color, size and position is provided by a pre-determined binary code.

The availability of such a chip would make possible self-driving cars, but the full potential of such a chip does not, of course, end there. The applications are everywhere: from medical diagnostics to language translators that fit in ones ear canal. It is this boundary between the real-world and the computer world that a Knowm™ device bridges. To understand how this bridge can be constructed, it is necessary to understand the two principle components that enable a Knowm™ network. The first aspect is the algorithm that dissects the world into a compact object-representation. The second is the physical process that is used to run the algorithm.

The move to molecular electronics is forcing a new perspective on computing architecture. The general direction is toward a homogeneous, locally connected structure that merges processing and memory. There are many reasons for this direction, and many thinkers have arrived here from different perspectives. Probably the most pervasive argument for homogenous and local architectures is the requirement of self-assembly and self-repair. It is feasible, it is thought, to find a system capable of self-assembly if the component pieces are distributed uniformly across a space.

Given the stated goal of object identification as indicated above, it seems natural to find inspiration from biological neural networks. After all, a brain is a self-organizing and repairing system capable of object identification and predominantly locally connected. The following algorithm is based on the neural principle of plasticity, the ever-present rules that modify the synaptic connection between neurons. The algorithm assumes the general network structure has already been formed: the neural circuits are ready and the synapse awaiting neural activity. The mapping from algorithm to nano-architecture involves finding a physical mechanism to emulate the specific plasticity rule, which will be discussed in the next section.

Although it is accepted that synaptic connections are responsible for learned activities and memories, there remains a perplexing problem. The synaptic connections between neurons undergo a complete recycling of receptor proteins in little less than one month. Neurons die. New memories are added. This problem is the same problem now being faced by designers of molecular electronics. Where is the information that enables a network (or nano-electronic chip) to repair itself in the face of faults? There are two potential answers to this question.

First, the information can be contained in the system itself. An example is a mechanism for repairing DNA in living cells. Given the information stored in the base sequences, there is a system (of proteins enzymes, in this case) capable of repairing faults to the base code. The algorithm discussed herein is based on the notion that the inherent structure of the environment, the "data stream" itself, contains the information for both learning and self-repair through coupling with a plasticity rule. Information about the environment (memories) may be strengthened and retained by constant exposure to one's environment, and more specifically the memory of an event may be retained without subsequent exposure to the event. The system is a dynamic network of continuously active plastic synapses. The result is a self-building and self-repairing computational system capable of object extraction.

If the environment does provide the reference for the stable storage of memories, where is this information and how does a network learn to use it? Within any data stream, be it visual, auditory, olfactory, or even data streams in intermediate stages of neural processing; the object of the neural-processing game is to find features (objects) within the data and to reliably act on those features.

As an example, consider the function of the cerebellum. In an ever-continuing process, the circuitry of the cerebellum attempts to learn a sequence of events, such as for example, the complicated motion and coordination of muscles required to ride a bicycle. At a basic level such a situation amounts to learning a desired response from a specific input. Such a specific input can be referred to as a "feature" in the environment. The feature can represent many possibilities, from complicated generalization to an extremely specific event.

Before an action can be performed in response to a particular input, the input must have a distinct representation by either the firing of a neuron or the firing of a specific group of neurons. In other words, if the goal is to create an "object finding" electronic chip, the chip must map the input space (pixels, speech waveform, etc) to a specific sequence of standardized digital outputs. These output need to be standardized so that traditional computer system may reliably act on the information.

Consider a simple two-dimensional data space, where features can be recognized as clusters of data points. Such a situation can be demonstrated with respect to FIG. 1, which illustrates a graph 100 of two-dimensional data space. In this two-dimensional space, out of all possible points, only a small subset ever occurs, which can be recognized as Features 1 through 5 as depicted in graph 502 of FIG. 1. This smaller subset can be referred to as the "structure" of the environment.

Our goal is to find a neural network capable of distinguishing one feature from every other feature. In addition, a mechanism is required for active repair. In other words, once a network capable of selective response to a feature is available, the network should maintain that function in the face of changes to the network, such as neural death or random changes to synaptic values. Furthermore, because a neuron may die at any moment, or a synapse may change randomly, the mechanism for network adaptation must be continuously active.

A plasticity rule is therefore sought that allows learning, while actively adapting the synaptic weights so as to retain that learned state. Another problem that one faces is that a particular environmental input may not occur; yet a mechanism is required, which is capable of maintaining specificity to this input. In other words, the retention of a neural response is required in the absence of rehearsal (i.e. remembering how to ride a bicycle after 20 years on not riding). Because neurons die, the plasticity rule must not maintain a specific weight vector, but rather a specific neural state.

The activation, Y, of the neuron can be provided as indicated in equation (1) below:

$$Y = f\left(\sum_{k=1}^{N} I_k - \theta\right) \quad [1]$$

In equation (1), the variable f(·) represents a squashing function such as tanh(·) that acts on the summed currents though N synapses, $I_k = V_k C_k$ and $\theta$ is a threshold, where $V_k$ is the voltage from the $K^{th}$ input and $C_k$ is the conductance of the $K^{th}$ weight. The simple neural model described herein is capable of dividing its synaptic space into two parts, i.e. it can fire or not fire in response to an input. By analyzing FIG. 1, it is immediately clear that no single neuron is capable of becoming selective to any arbitrary feature. Whereas features 1, 3 and 4 are linearly separable, features 2 and 5 are not. Because any one neuron may only make a "slice", one appropriate question is, "what is the best slice?"

One type of slice can be eliminated, which is a slice that occurs at the boundary of the data distribution. Such a situation does not provide information and is therefore not wanted. Is there an efficient way to "dice up" the space, keeping in mind that in the end a specific response to only one feature is desired? With a mind on efficiency, another type of slice can be eliminated, or at the very least minimized. Ideally, the slice should cleanly divide the data space into two half's without dividing any one feature. In the field of machine learning, this can be seen as "maximizing the support vectors".

Figure 2:
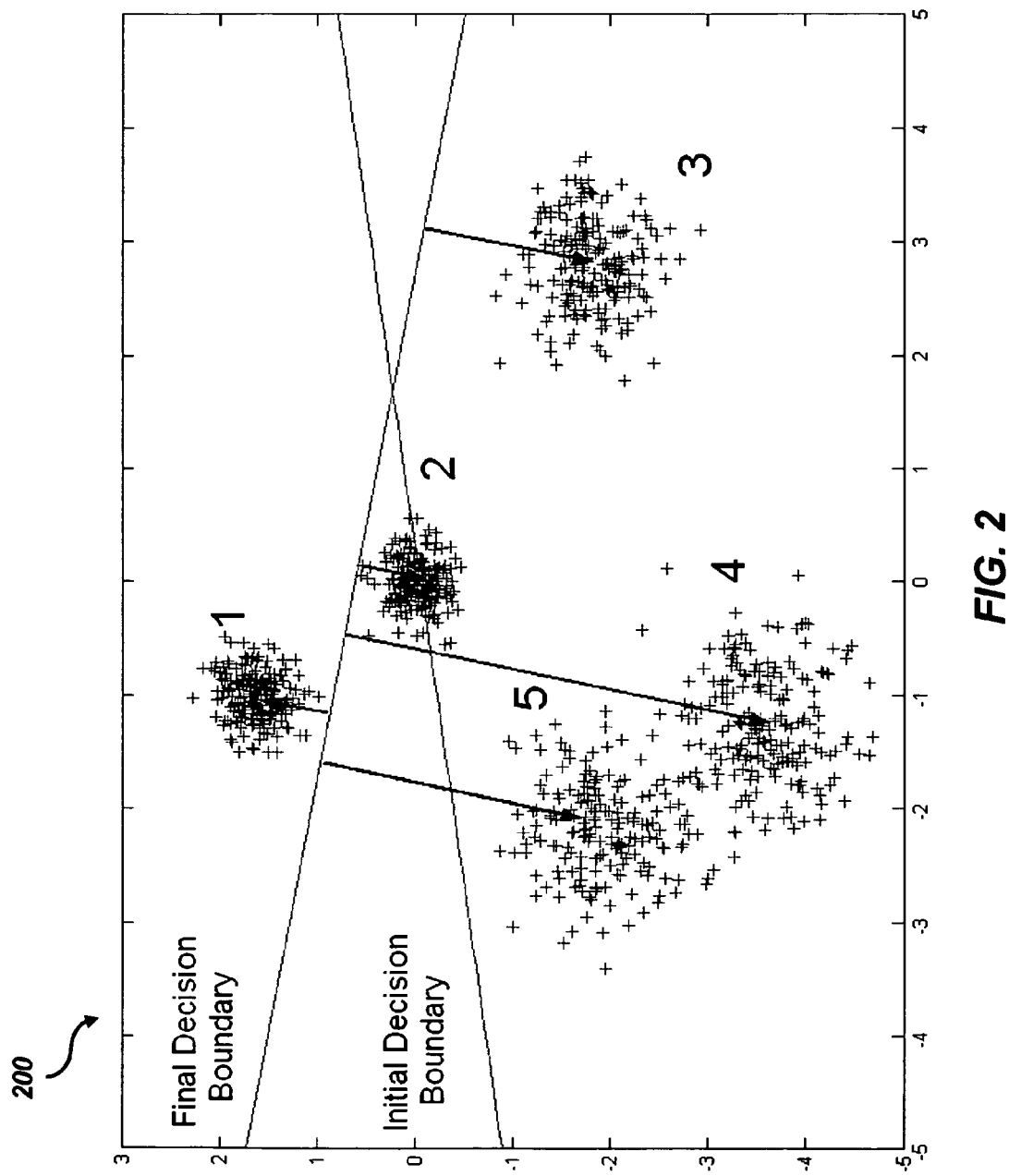
FIG. 2 illustrates a data space graph illustrating a plasticity rule, wherein an initial random weight vector splits a feature in two, so that the decision boundary is moved to cleanly divide features from one another in accordance with an embodiment of the present invention.

Imagine a neuron, represent by its decision boundary, given random weights and placed in the data space of graph 100 of FIG. 1. A plasticity mechanism is therefore desired that converges to a state that divides, as cleanly as possible, the data space into two parts. This can be seen with respect to FIG. 2, where given the initial random weight vector that splits a feature in two, the decision boundary has moved so as to cleanly divide feature one from the others. FIG. 2 therefore illustrates a data space graph 200 illustrating a plasticity rule, wherein an initial random weight vector splits a feature in two, so that the decision boundary is moved to cleanly divide features from one another in accordance with an embodiment of the present invention.

In essence what is required is a plasticity rule that finds a bimodal projection. Given our simple neural model, the rule must depend on pre- and post-synaptic activity. The post-synaptic activity is proportional to the perpendicular distance from the decision boundary. The farther "over the line" the input, the higher the post-synaptic activity becomes. If one thinks of the plasticity rule as a mechanism that moves the decision boundary by a small amount in response to an input, then the final decision boundary in FIG. 2 represent a balance, where the activation (or non-activation) from Feature (1) is balanced by the activation of the other features.

To achieve this balance, a much smaller contribution is required from those inputs considerably over the decision boundary. In fact, the contribution should go to zero as the post-synaptic activity is saturated either high or low. To demonstrate this situation, note that Features 2-5 would not only achieve a higher post-synaptic activation, but would occur more frequently as well (in this case there is an equal probability for each feature). The final decision boundary would be pushed away from the data space until it no longer separated any features.

If a methodology can be found for the features to "push" the decision boundary, then by the addition of an activity-dependant factor, a rule can be generated that provides a local minima at the desired locations, i.e. at places that cleanly divide the features. It is known that Hebbian Learning accomplishes just this: If an input results in the positive activation of the neuron, then Hebbian learning will modify the weights so that the same input will produce a greater positive activation. Likewise, inputs that result in negative output will be modified so that the same input would produce a more negative output. Specifically, the weight vector (decision boundary) will be moved parallel or anti-parallel to the input vector, depending on the sign of the update (Hebbian or Anti-Hebbian). A rule can now be postulated, as indicated by equation (2) below:

$$\Delta w_i = \alpha x_i y (1 - y^2) \quad [2]$$

In equation (2), the variable $\Delta w_i$ represents the change in the $i^{th}$ weight, while the variable $\alpha$ represents a learning rate. The variable $x_i$ represents the $i^{th}$ pre-synaptic activity and y is the post synaptic activity. This learning rule is a generalized Hebbian learning rule where $(1-y^2)$ controls the transition from Hebbian to Anti-Hebbian learning. Equation (2) can be referred to as the Anti-Hebbian and Hebbian rule, AHAH, (pronounced aha!). Such a learning rule can converge to multiple local minima and depends on the initial conditions, learning rate a and noise level of the input data. Some of these local minima are useful for classification purposes while others are not. This rule has been found to extract the Independent Components (IC) of data and is consequently very useful for classification tasks. Such a rule was used to determine the final decision boundary in graph 200 of FIG. 2 and indeed can accomplish the desired goals outlined earlier.

Figure 3:
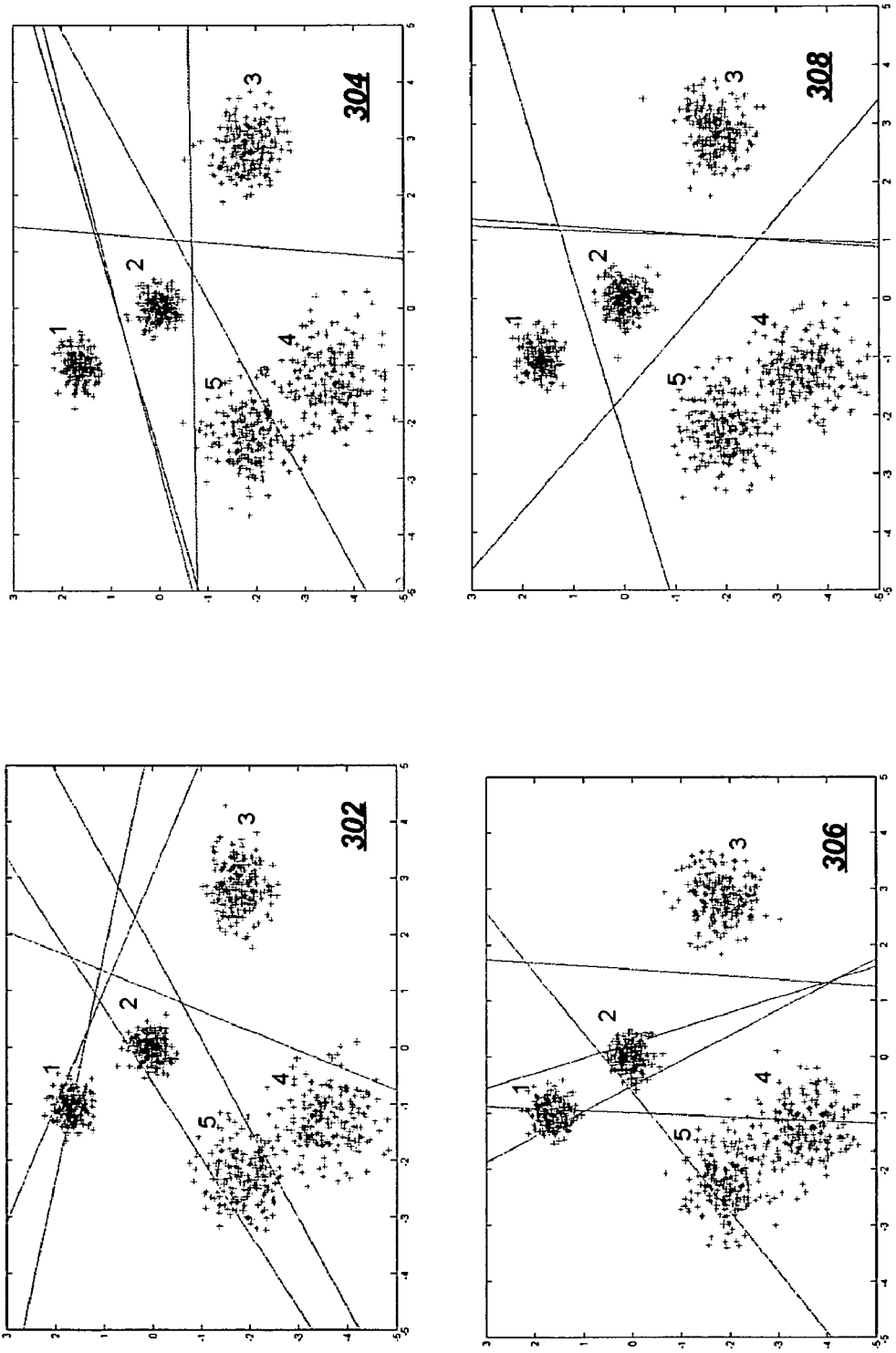
FIG. 3 illustrates a group of data space graphs that together illustrate the application of the Anti-Hebbian and Hebbian (AHAH) rule in accordance with an embodiment of the present invention.

FIG. 3 illustrates a group of data space graphs 302, 304, 306, 308 that together illustrate the application of the Anti-Hebbian and Hebbian (AHAH) rule in accordance with an embodiment of the present invention. Given the random initial weights in graph 302, the rule quickly converges to the data structure illustrated in graph 304. Similarly, graph 306 converges to graph 308. As FIG. 3 demonstrates, random initial weights certainly do not guarantee the weight vectors find a unique slice after convergence with AHAH. In the case of a→b (i.e., graph 302 to graph 304) two weight vectors fell into the same (or opposite) fix points between Features (1) and (2). For c→d (i.e., graph 306 to graph 308), the same situation occurs between Features (5,4) and (1,2,3) as well as (1,2,4,5) and (3). The application of lateral inhibition is a mechanism to prevent neurons from falling into the same state and can be expressed simply as indicated in equation (3) below:

$$y_j = y_j - \xi \cdot (y_{j-1} + y_{j+1}) \quad [3]$$

In terms of integration of a lateral inhibition function into a chip structure, it should be recognized that our final "neural circuit" will represent a bank of neurons, not an individual neuron. The non-synaptic functions of neural summation and lateral inhibition (no plasticity on inhibitory connections) will be accomplished with traditional CMOS technology, whereas the synapses and their plastic nature are emulated with self-organizing nanoparticles.

The result of lateral inhibition is illustrated with respect to FIG. 4, where the same initial weight vectors of graph 306 are forced into separate states as indicated in graph 400 of FIG. 4, although one weight vector is lost to the fringes of the data distribution, and can be seen in the top right corner. From graph 400 of FIG. 4, one can appreciate how a mechanism for bringing a "lost" weight vector back into the data distribution would be helpful, and can be accomplished by an activity-dependant scaling plasticity rule.

The scaling rule, however, must be overshadowed by the plasticity rule that determines the fixed points, otherwise the weights will converge to a global minimum (the minor component) and all states will be lost. In other words, the scaling rule must be highly non-linear. Consider, for example, the decision boundary that separates states 1 and 2 in graph 502 of FIG. 2. For only $\frac{1}{5}^{th}$ of the time, the activation of the neurons is positive. If a scaling rule is desired to bring a neuron back into the distribution, the scaling rule should not effect those situations where a neuron finds a fairly skewed separation. For this reason, an activity-dependant scaling rule can take the form depicted in equation (4) below:

$$\Delta y = -\beta \cdot y^{\eta} \quad [4]$$

In equation (4), the variable $\eta$ is large, typically greater than 4. Because the desired effect of an activity-dependant scaling rule is to prevent "run away weights", a limit on the magnitude of a weight would also have the desired effect. In terms of a nano-scale implementation, weight restriction represents one possible solution, as the conductance of a physical connection should not fall below zero or above a certain maximum. Graph 502 of FIG. 5 therefore illustrates the result of an activity-dependant rule applied to the initial weight configuration of graph 404 depicted in FIG. 4. Notice how the outlying decision boundary is brought back into the distribution, yet the fixed-points remain undisturbed.

Recall that one of the goals outlined earlier is to construct a network capable of selective response to one of the features. Constructing such a network is relatively straightforward, if the neural ensemble is utilized as an output value. It is desired that the polarity of each fixed state be such that when one only feature is present, all the neurons agree. Consider, for example, graph 502 of FIG. 5. Flipping the polarity of four of the five neurons and analyzing the average output from all neurons can make the ensemble made selective to Feature (2). As long as the weight vectors of the neural ensemble are sufficiently separate so that a feature is isolated, the ensemble can learn the feature. Learning is thus equivalent to changing the states of certain neurons, or at least forbidding some states from occupation.

The fundamental "unit" of computation, in this case, can be the neural ensemble that responds selectively to one feature. Each ensemble is cable of mutual inhibition so as to converge to separate states. An ever-present and highly nonlinear activity-dependant-scaling rule maintains decision boundaries in the distribution, while a training signal (to be discussed shortly) can be utilized to prevent "forbidden" states from being occupied. For the data space depicted in graph 502 of FIG. 5, a total of five neural ensembles would be needed to isolate each feature, while each ensemble would require anywhere from one neuron (linearly separable, i.e. feature 1,3 and 4) to three or more (non-linearly separable, i.e. feature 2 and 5). By application of a training signal, a non-linearly separable feature may be isolated by an ensemble by forcing only certain states to be occupied. In the absence of the training signal, the neurons are held stable by the underlying structure of the distribution, i.e., the fixed points of the plasticity rule.

An important clarification is now necessary. A neuron's stability is related to the features themselves. Suppose, for instance, that Feature (1) suddenly disappeared, or that its occurrence was suddenly highly unlikely. In effect, this would send the corresponding neuron, whose decision boundary happens to distinguish the feature, off into the fringes of the distribution. The scaling rule (if there is one) would pull the decision boundary back into the remaining distribution, and the state would be lost along with the ability to distinguish the feature. What is needed is a "base set" of features that occur regularly. Such a base set was illustrated in the previous figures.

Higher-level features can be distinguished from the base set. One example is speech, where an individual word may not be spoken for many days or years, but the underlying phonemes occur quite regularly. The neural ensemble can be thought of as a unit for recognition of a word, and the individual states of neurons within the ensemble occupying a state made stable by the frequent occurrence of the underlying phonemes. In fact, it is likely that selective response to a phoneme is the result of a neural ensemble in which each neuron has found a stable sub-phonemic structure.

In this case a row of neural ensembles would be used to extract a sub-phonemic base set, which in turn is used to extract the phonemic base set. Such a circumstance is illustrated in graph 602 of FIG. 6. Another example is vision. The stable states occur at a small scale, and are sometimes recognized as edge filters. From a stable basis set, higher-level feature detectors can be constructed. The feature detectors themselves simply represent a cluster of neurons occupying distinct states that happen to all agree when it comes to the presence of one feature. It is interesting to note that just this sort of organization is present in the human cortex: cortical columns in lower level visual cortex become selective to edges of varying degrees of orientation, and this structure is determined early in life, during a "critical period".

In this framework, learning represents the selective occupation of fixed points of a plasticity rule operating on a continually present environmental structure. To move or remove neurons from a state, the normal plasticity rule should be disturbed. There are two choices. First, e another plasticity rule can be invoked when the target feature is present. Second, the activation of the neurons can be disturbed in a particular manner (e.g., when the target feature is present). Such a situation similarly occurs during mutual inhibition. The second option is more desirable because it avoids the baggage of yet another plasticity rule, which is more difficult to implement physically than one plasticity rule. Note that mixtures of nanoparticles can be employed for this purpose, but the costs may outweigh the gains in this venture.

Recall that the neural output is squashed. Consider for this example an absolute lowest value of −1 and an absolute maximum of +1. Assume for a moment that the transition function is saturated, so that all neural outputs are ±1. Now take a look at the activity-dependant portion of the AHAH rule depicted in graph 602 of FIG. 6.

Note that at saturation, the weight update is zero. If we desire to train a network to learn a particular feature, we can proceed as follows. An input is presented. If the input happens to be from the target feature, we activate each neuron in the cluster by a set amount, say 1.1. Looking at the figure, if the neural output (y) was +1, the addition of 1.1 would result in no weight modification, as the squash sum of total activation would still be +1 ($\tanh(1+1.1) \cong 1$). If the neural output were −1, however, the addition of 1.1 would result in significant Hebbian learning and push the state closer to zero activation, which will in turn cause more of a weight update.

As the activation approaches zero, the additional activation of 1.1 will cause the weight update to approach zero again. In other words, the closer the neuron comes to falling into another state, the less it is pushed. How can we solve this problem? The solution is that this is actually not a problem, as long as the variance of the plasticity rule is small compared to the variance of the feature. One can easily see how the teaching mechanism will bring the decision boundary to a point that splits the feature in half.

But what happens if the feature is of the same or larger variance than the plasticity rule? In this case, when the decision boundary has penetrated the feature distribution, there is roughly equal likelihood that the input point will fall on either side of the decision boundary. When the input falls on the positive portion, the addition of the teaching signal will result in no weight update; but when the input falls on the negative portion, the addition of the teaching signal will push the decision boundary further into the feature. Such a circumstance is illustrated in graphs 702, 704, 706 of FIG. 7, which demonstrates one neuron being moved from a state that divides Features (1,2) from (3). Specifically, the teaching signal can be applied when the input belongs to feature 2. Before learning, the state maximizes the margin between (1,2) and (3). Immediately after learning, notice the state possess almost (but not completely), penetrated feature 2. The state is only able to maximize the margin in the new state once the learning signal is turned off.

Figure 8:
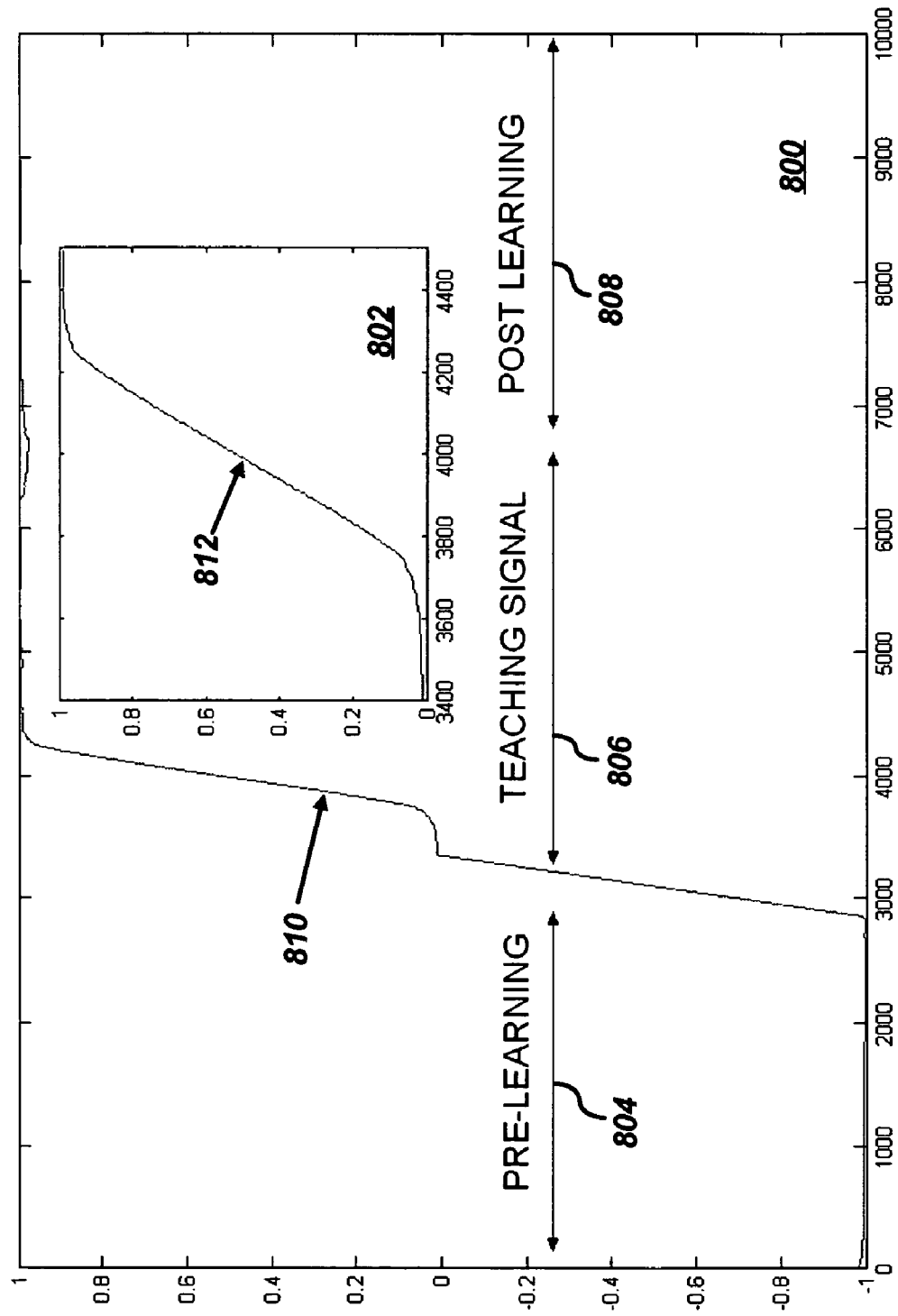
FIG. 8 illustrates a graph depicting the average output of a neuron in response to Feature 2depicted in FIG. 7, in accordance with an embodiment of the present invention.

FIG. 8 illustrates a graph 800 depicting the average output of a neuron in response to Feature 2 depicted in FIG. 7, in accordance with an embodiment of the present invention. Graph 800 therefore illustrates the average output of the neuron in response to Feature 2 illustrated in 702, 704, 706 of FIG. 7. Before learning, as indicated by arrow 804 labeled "Pre-Learning" in graph 800, the feature is clearly in a state that classifies feature 2 as (−1). As the teaching signal is applied, the neuron activation immediately jumps to zero (i.e., teaching signal=1). Note that in graph 800, arrow 806 represents the teaching signal. Arrow 808, on the other hand, represents post-learning activities. Pre-learning activities are therefore separated from the teaching signal by line 810 in graph 800. An inset graph 802 depicted in FIG. 8 illustrates that as the decision boundary penetrates the feature; the rate of convergence goes from exponential (approaching feature) to linear (in the feature).

The linear regime is due to the much smaller variance of the plasticity rule. For instance, when the decision boundary splits the features in two, roughly the same amount of inputs fall on either side of the boundary. As the positive inputs do not contribute to weight modification, the rate of convergence is roughly equal to the integration of all inputs resulting in activation from −1 to 0. If the activation function is steep, one can expect there to be a roughly equal force pulling the decision boundary through the feature. That is, until the decision boundary reaches the other side of the feature, in which case there are no more inputs immediately to the negative portion of the boundary and the convergence rate quickly goes to zero.

A neural cluster capable of selective activation to a feature within the environment can now be constructed. Such a situation can be demonstrated in two-dimensions, but a case can be made for the validity of real-world data of large dimension. At this point, it is worth reviewing the general concept, and how it relates to higher dimensions. Given any data set, be it visual, auditory, or something else entirely, the underlying assumption is that there is some inherent structure at some scale, and this structure occurs frequently.

As an example, consider the case of a 256 gray-scale image at 5 mega pixels. Each object in the image lives in an extraordinarily large dimension, where there is $256^{(5,000,000)}$ possible images. If one takes the entire images as a vector, two pictures of the same object under two lighting conditions would result in two very different vectors. The space would be so under-sampled as to effectively provide no fixed points and the plasticity rule would be useless. This of course is the curse of dimensionality.

As the size of the image is scaled down, however, so that the input vectors are a subset of the original image, the space becomes smaller and the "features" more distinct. Although the features at this level do not represent objects, they occur frequently enough so that a plasticity rule can converge relatively quickly. It is known that the Independent Components of natural images, at a small scale and for "natural scenes", are edge filters. Learning an object would then mean training a cluster of neurons so that each neuron in the ensemble represents a piece of the object.

Only when the object matches the target object do all neurons agree. The recognition of a higher-level object is thus accomplished by an ensemble of neurons locked onto specific states of a subscale structure. The advantage being that the sub-scale structure occurs very frequently, so that the states of each neuron in the ensemble can be preserved, consequently preserving the "ensemble state". A memory can then be stored and repaired by referencing the memory to the structure of the environment, so that no rehearsal is necessary. As neurons die, the on-going plasticity rule modifies the synapses so as to maintain the neural state.

Figure 9:
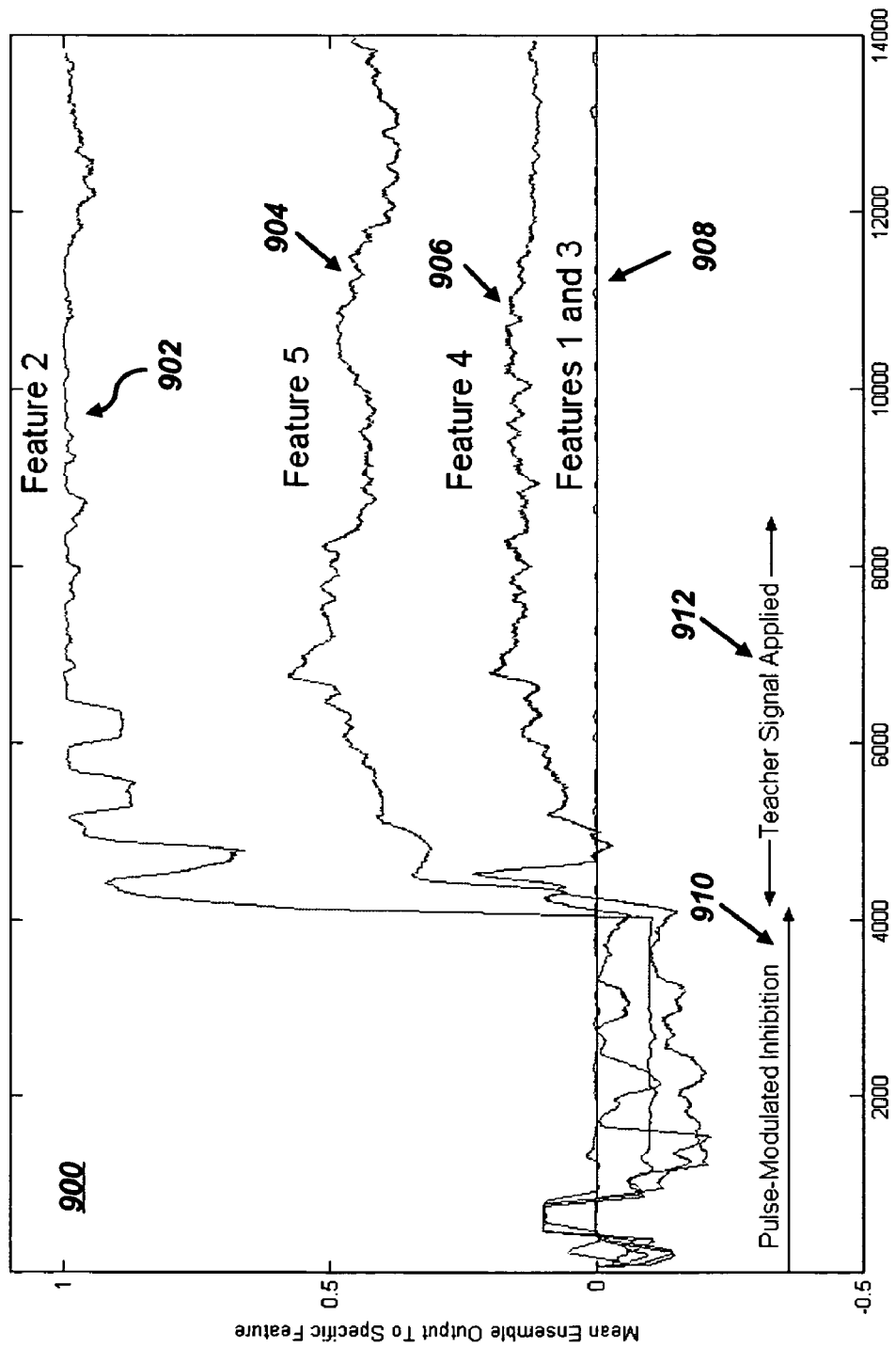
FIG. 9 illustrates a graph illustrating a mean ensemble output to specific and pulse-modulated inhibition and teacher signal applied data, in accordance with an embodiment of the present invention.

FIG. 9 illustrates a graph 900 of the average ensemble output from a group of twenty neurons in response to each feature in the distribution depicted and described earlier with respect to FIGS. 1-5, in accordance with an embodiment of the present invention. In graph 900 of FIG. 9, Features 1 and 3 are represented by line 908, while Feature 4 is represented by line 906. Similarly, Feature 5 is represented by line 904 and Feature 2 represented by line 902. Pulsed Inhibition as indicated by arrow 910 in graph 900 of FIG. 9 can be utilized to separate the states. Recall that a neuron can only achieve the minimal energy state if the teaching signal was turned off. Lateral inhibition is quantitatively the same as the teaching signal (i.e., see arrow 912), so pulsed inhibition can be utilized to allow for maximal state convergence. Similarly, a pulsed-teaching signal can be utilized. Application of a teacher signal is indicated in FIG. 9 by arrow 912. In other words, the neurons can only completely converge in the absence of a teaching or inhibitory signal. The teaching (or inhibitory) signal "kicks" the neuron beyond the local energy maxima so that it can descend into other minima.

Graph 900 of FIG. 9 illustrates that the mean output of +1 indicates that every neuron in the ensemble occupies a state that puts Feature 2 "on the positive side of the fence". Notice how the ensemble state went through intermediate, and stable, states before converging to total agreement. This is due to the pulsed teaching signal. Also note the considerably selective response to Feature 2 when compared to the other Features. The same procedure can be utilized, for example, to construct neural ensembles capable of extracting base sets from speech waveforms.

Thus far it has been demonstrated how a continuously active plasticity rule can be utilized to create an energy landscape where learning is a function of selective occupation of fixed-point states. What remains to be seen is a by-product of the dynamic nature of this process: adaptive fault tolerance.

Although neural networks exhibit inherent fault tolerance due to connection multiplicity and a distributed representation, the continuous adaptation of weights can provide substantial improvements. The AHAH plasticity rule can greatly improve fault tolerance for random weight fluctuations and input-line faults by maintaining weight equilibrium in a local attractor state. In addition, there is an exponential improvement in fault tolerance by the addition of redundant weights.

An important characteristic of biological neural systems is their continuously adapting connections. Not only do connection strengths change continuously, but input lines are also lost to neural death. Stability under this type of dynamic environment seems to require a dynamic network capable of tracking and dealing with the faults and changes in neural circuitry as they occur and thus requires a mechanism for the constant modification of weights.

The neural network community has proposed several architectures like Hopfield Networks and Self Organizing Maps that are inherently parallel and exploit system dynamics to solve computational problems. Solutions are represented as equilibrium points and the convergence of the system effectively provides self-organized fault tolerance. This type of approach appears ideal for fault tolerant computing with next generation devices, but to date has been limited to specific applications for which these systems have been proposed (e.g. associative memories and clustering).

Suppose that the connections from inputs into a neuron were to fluctuate slightly in a random manor, and that the connection does not possess an adaptation mechanism. Eventually, after a period of time, the weight values will drift and the neuron looses its classification ability. Ideally, a plasticity rule should correct for these fluctuations and maintain the weight vector about the initial values. For an unsupervised rule, this requires that the weight vector used for classification also be a fixed point of the plasticity rule. Because it is desirable to use the same plasticity rule for different classification tasks, it is necessary for the rule to have many fixed points associated with many different possible classifications. The goal is to find an online mechanism for updating the weights to help account for the faults. Adaptation mechanisms can be investigated with the general form:

$$\Delta w_i = \alpha f(w, x, y) \quad (5)$$

In equation (5), $\Delta w_i$ represents the change in the $i^{th}$ weight from one time step to the next, $\alpha$ is a small constant and $f(\square)$ is some function that depends on quantities that are local (physically) to the $i^{th}$ weight. A useful framework for analyzing this type of update is stochastic gradient ascent of an objective function $J(y)$, in which case (4) can be expressed as equation (6) below:

$$\Delta w_i = \alpha \frac{d}{dw_i} J(y) \quad (6)$$

We denote the derivative of $J(y)$ with respect to y as $g(y)$, and the update is:

$$\Delta w_i = \alpha x_i g(w^T x) \quad (7)$$

Suppose that the connections from inputs into a neuron were to fluctuate slightly in a random manor, and that the connection does not possess an adaptation mechanism. This type of rule can be utilized for determining interesting statistical structures in data. As an example, consider the objective function depicted in equation (8) below:

$$J(y) = E\{y^2\} \quad (8)$$

In equation (8), $E\{x\}$ is the expectation with respect to x. Substituting equation (8) into equation (7) and using single sample approximations to expectation, the Hebbian learning rule can be derived as indicated in equation (9):

$$\Delta w_i = \alpha x_i y \quad (9)$$

When the input data has zero mean, this learning rule will cause the weight vector w to align with the direction of maximum variance, that is, the first principle component. Conversely, the anti-Hebbian learning rule $\Delta w_i = -\alpha x_i y$ will cause the vector w to align with the direction of minimum variance. For both learning rules to be stable, constraints must be placed on the magnitude of w since otherwise the objective function of equation (8) will grow without limit.

The quadratic objective function of equation (8) possesses a global maximum (or minimum) and the learning rule converges to a single fixed point. The weight vector will converge to the principle component of the data regardless of the initial, or desired value of w. Higher-order objective functions might be utilized in accordance with alternative embodiments of the present invention. Such objective functions generally possess multiple local maxima and learning rules that converge to one of many fixed points.

The multiple fixed points of higher-order learning rules can provide a novel mechanism for learning and fault tolerance in dynamic neural networks. The basic assumption is that an objective function can be found that is related to, at some level, the desired behavior for a neuron. If this is the case, it follows that there is a local maximum, and hence a learning rule with a fixed point close to (or at) the desired value of w when there are no faults. Thus, the performance of the output neuron will not degrade significantly with a continuously active learning rule and no faults present. Additionally, with faults present, the input statistics can shift the local fixed point and the learning rule can track this shift by modifying w accordingly.

As an example, if we design a network to calculate the first principle component of the data then the objective function represented by equation (8) coincides with the desired behavior. In other words, our approach to fault tolerance is equivalent to tracking the principle component over non-stationary input data. For the classification problem it is unlikely that the direction of maximum variance will coincide with a classifier produced through supervised learning. A neuron's ideal function is to classify all inputs into two categories and either fire or not fire.

If one imagines a neuron has already been taught a desired classification, then it is relatively straightforward to find a strategy capable of maintaining the classification. Every input is either associated with one of two classes, (+) if the input is above threshold and (−) if it is below. At every time step, connections are reinforced according to what class the neuron is currently indicating. For example, if the neuron were currently indicating positive class (+), then a strategy would be to weaken all connection coming from inputs that are negative and visa-versa. Thus, a plasticity rule that finds a multi-modal projection is a likely candidate for a fault-repairing plasticity rule. Several objective functions may be utilized, which measure multimodality. The fourth-order cumulant, or kurtosis, can be minimized as indicated by equation (10) below:

$$J(y) = E\{y^4\} - 3E\{y^2\}^2 \quad (10)$$

Once again, the weight vector w must be bound to produce a stable learning rule. One way to accomplish this is to place a constraint on the variance as indicated for example by equation (11):

$$E\{y^2\} = 1 \quad (11)$$

Such a constraint also means that the sensitivity to second order statistics can be reduced and preprocessing steps such as, for example, whitening (de-correlating the data) is not required. This constraint can be included in the stochastic ascent learning rule by introducing a penalty term with scaling $\beta$:

$$J(y)=(E\{y^4\}-3)-\beta E\{y^2\} \tag{12}$$

The derivative of equation (8) with respect to y, can be substituted into equation (6) followed thereafter by multiplication by −1 (because it is desired that the learning rule minimize kurtosis). The following equation (13) can then be derived as follows:

$$\Delta w_i = \alpha x_i y (b-ay^2) \tag{13}$$

Note that the values a and b are constants. If we set a and b to 1, the already familiar AHAH rule can be found. This rule has been studied in other contexts, such as independent component analysis. It is interesting to note that problems might arise with this rule if inputs fall on the decision boundary, or in other words, if the data is not linearly separable. In this case, the strength of the local attractor state is diminished and with it the ability to hold stable in the state when subjected to weight noise and input faults.

To demonstrate the effect of seperability and redundancy on fault tolerance, the weights and inputs can be parameterized as follows: Inputs consisted of D vectors are presented repetitively, where D is the number of inputs to the neuron (not including redundancy). Every vector is a normal distribution with magnitude one, centered at the respective input line and of variance $\sigma$. Thus, with very small variance the inputs become non-overlapping and orthogonal.

Each weight can be assigned a value of unit magnitude and alternating sign according to a spatial wavelength $\lambda$. For example, for $\lambda=1$, the weight vector is [1,−1,1,−1,1−1, . . . ]. And for $\lambda=2$ the weight vector is [1,1,−1,−1,1,1, . . . ]. Thus, by decreasing $\lambda$ and increasing $\sigma$, one increases the 'frustration' and reduces seperability. To study the effect of redundancy, each input line is replicated R times and subjected to independent faults. The total number of connections is therefore given by D×R.

The following three types of faults can be considered: synapse faults, random input faults and dead input faults. Synapse faults are random fluctuations of synapse values and are computed by adding a random number generated from a normal distribution with magnitude $N_{amp}$ to each weight on every time step. Random Input faults are computed by replacing the appropriate value of a percentage of all input lines with a random value on every time step. The random value can be selected from a uniform distribution between −1 and 1. Dead input faults can be computed by replacing the appropriate value of a percentage of all input lines with zero.

To illustrate the stability of the AHAH rule, orthogonal inputs ($\sigma=0.1$) can be provided to a network with dimension D=16 and $\lambda=1$ while subjected to synapse faults. The learning rate can be set to Lrate=1/D and the fault amplitude to Famp=Lrate/3. The network can be run until the first error is detected and the time step of the first error recorded, the first error being defined as the first disagreement between the faulted network and an equivalent network with no faults and no adaptation. FIG. 1 herein illustrates the mean time-to-first-error as a function of the redundancy of the connections. The performance of AHAH can be compared to a network with no weight adaptation under identical faults.

As one can see, the stability of the connections grows exponentially with increased redundancy and only linearly, as expected, for no adaptation. This can be explained in the following way. Every weight in the network is either positive or negative. If inputs are orthogonal, the weights define the class: positive weights for the (+) class and negative weights for the (−) class. Suppose a weight is faulted. With no redundancy, or a redundancy of two, there is no information available as to what sign the weight should be.

With a redundancy of three or higher, however, the majority determines the output class and the weights that disagree are weekend until their sign is changed. In this way, a group of redundant weights "pull" on the faulty weight. With the AHAH rule active, weight faults must occur fast enough so that a majority of the redundant weights change sign, otherwise the plasticity rule will repair the weights. In the case of no plasticity, the probability that the network will result in error is given by the sum of the probabilities that any given weight changes sign, or $P_{error}=p_{w1}+p_{w2}+p_{w3}+\ldots$. If the fault amplitude is small compared to the learning rate, the probability of a network fault under an adaptation scheme such as AHAH is now multiplicative: $P_{error}=p_{w1} \cdot p_{w2} \cdot p_{w3} \cdot \ldots$ One can see the exponential increase by comparing the time-to-first-error of AHAH and the control depicted in FIG. 1.

There are two potential trivialities with respect to FIG. 1. First, the inputs had a very small variance and the network was consequently minimally frustrated. Second, similar performance can be obtained from a much simpler rule for weight modification, namely $w_{t+1}=w_t+(w_D-w_t)$. That is to say, if the weight deviates from the desired weight, adjust accordingly. Addressing the first potential triviality, one can see from FIG. 2 that the AHAH rule provides stability for all variances in inputs for synapse faults and in fact has an ideal variance, which is a result of the chosen $\lambda$. Addressing the second triviality requires investigating other types of networks faults. Consider the case of a faulty input line, where the input is no longer correlated with the desired output. In such a case, the weights must be lowered so as to weaken the influence from the faulty input. Alternately, if the input becomes inactive, the weights to other inputs need to be increased so as to make up for the loss. It is therefore not known what the desired weights should be, only what the desired output should be. A plasticity rule that can fix both weight and input faults by the modification of weights is therefore not trivial and demonstrates a powerful degree of fault tolerance.

Input faults can occur in a few flavors. First, the input simply goes to zero, a.k.a 'dead input fault'. Second, the input may still carry a signal, but has been corrupted by noise and is no longer correlated with the desire classification, a.k.a a 'random input fault'. The faults can also occur in two ways: all at once or accumulate gradually over time. Both random and dead input faults can be investigated under sudden and gradual fault introductions. For a gradual fault introduction, a specified percentage of total input lines are made faulty in a linear schedule from time-step (ts) 1000 to 9000. The mean classification error (as compared to the output of the un-faulted network) from ts=9000 to 10000 is taken as the performance of the network. For sudden fault introductions, all faults occur at time step 1000 and performance is taken as the mean classification error from ts=9000 to 10000. For all experiments, unless otherwise noted, the redundancy is set at R=5, D=16 and $\lambda=4$.

Figure 5:
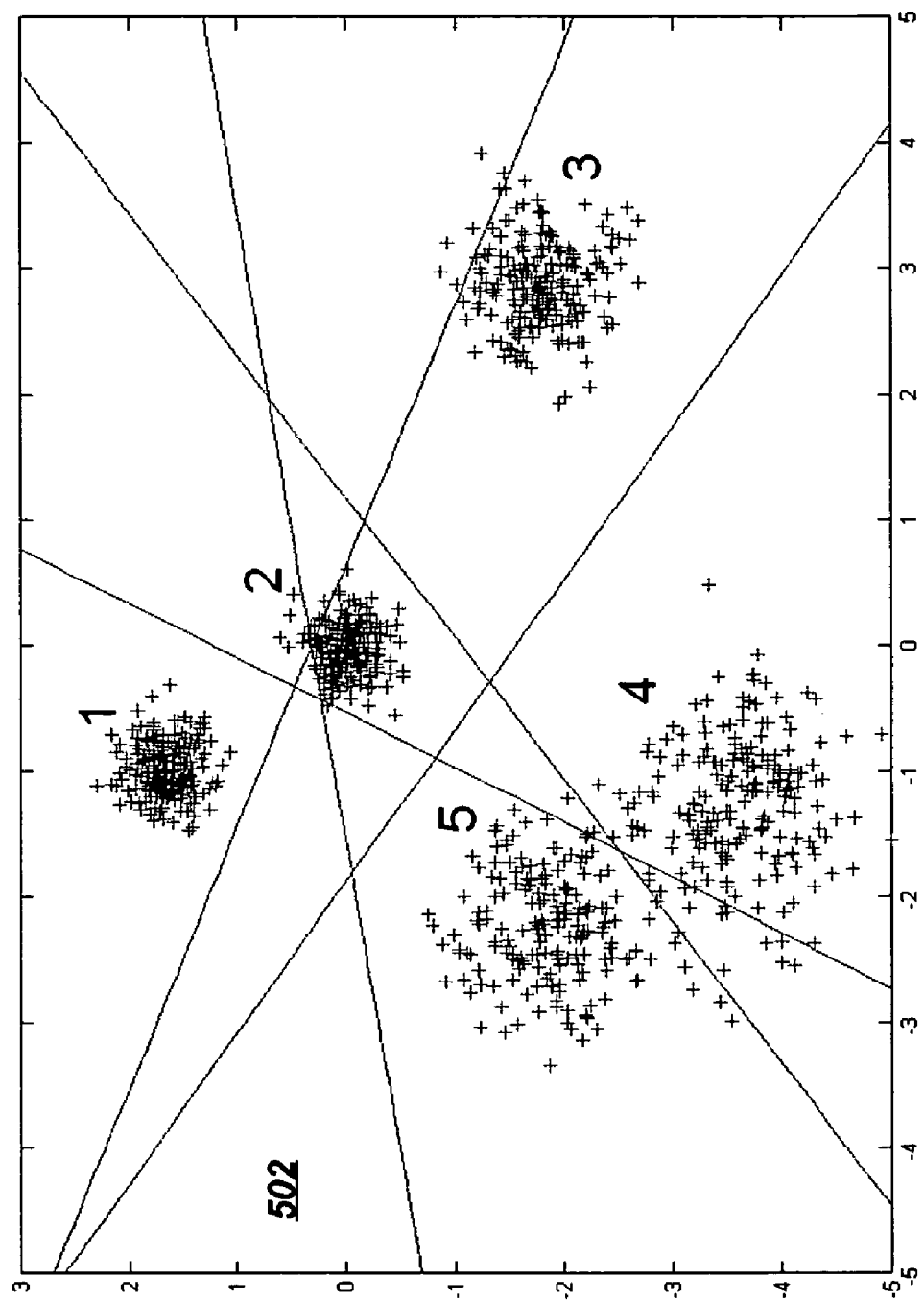
FIG. 5 illustrates a graph of a data space, wherein the polarity of four of five neurons is flipped and the average output from all neurons can be analyzed so that an ensemble can be made selective to Feature (2) thereof in accordance with an embodiment of the present invention.

FIG. 3 illustrates the mean error as a function of variance of input for a 50% gradual random fault introduction. For a range of variances, one can see that AHAH performs substantially better than no adaptation, and only slightly worse for small variances. Like the synapse faults, the optimal variance is a result of the chosen $\lambda$. FIG. 5 highlights the importance of redundancy for gradual random faults. The variance was set at the optimal value of 1.83 obtained from FIG. 3 (note the log scale). Interestingly, an optimal redundancy can be seen at R=4. This optimal redundancy is only observable for a narrow range of variances (near-optimal) and under random faults.

One possible explanation is the following. One can see from a plot of the AHAH rule that the magnitude of the update is dependant on the activity of the neuron. As the activity becomes very high, the magnitude of the update approaches zero. Because the magnitude asymptotically approaches zero, the effect is to constantly seek to maximize the margin of the decision boundary, albeit at a decreasing rate. The activity of the neuron is in turn a function of the redundant weights.

As the redundancy increases, the amount of activity being contributed from each redundant synapse goes down. Consequently, the loss of only one weight out of 10 causes a small decrease in activity and as a result a smaller magnitude weight update. With a smaller redundancy the fraction is higher and the weight update stronger. Thus, faults are dealt with faster. In our experimental setup, fifty percent of the input lines become faulty over a set amount of time steps (e.g., 8000). As the redundancy is increased, the total number of inputs is actually increased by a factor of R, so that although the percent fault rate is the same, the total number of faults is greater.

Figure 6:
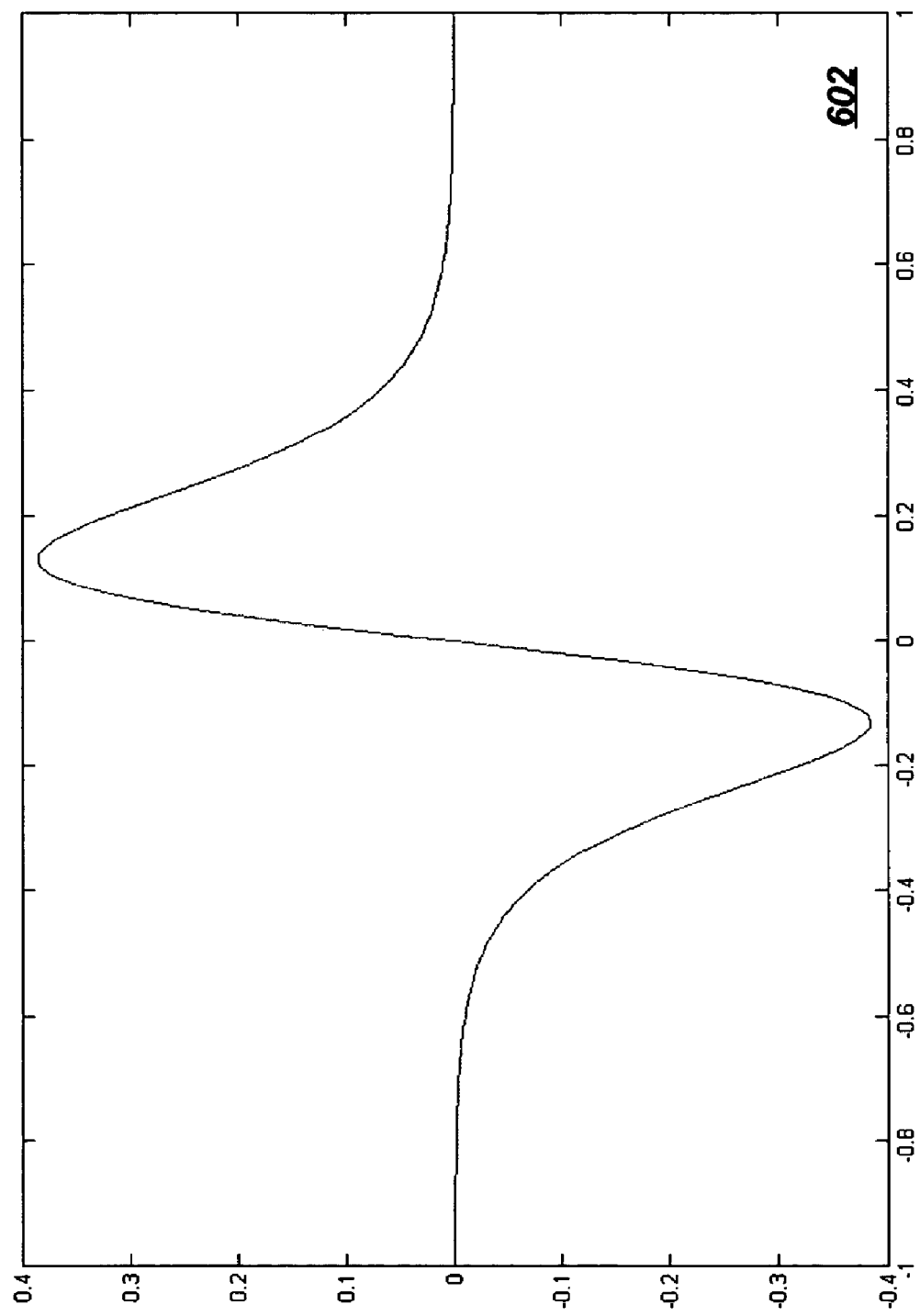
FIG. 6 illustrates a graph illustrating how a row of neural ensembles can be utilized to extract a sub-phonemic base set, which in turn can be utilized to extract a phonemic base set, in accordance with an embodiment of the present invention.

FIGS. 5-6 include data repeats the experiments FIGS. 3-4 for dead input faults. For a range of variances, one can see that AHAH performs better than no adaptation. One particularly interesting observation is the sharp transition from 50% error to no error. Note that the connection network described herein can adapt to sudden input faults. As one can appreciate, there is little difference between the performance of AHAH and the control for sudden dead input faults. This is contrasted with the performance of gradual fault introductions. The full power of the adaptation rule can be appreciated when applied to the context of gradual fault introductions, which are presumably more likely in any physical implementation of a neural system.

The on-line adaptation of weights is a powerful mechanism for network robustness in the face of faults and has application not only in explaining the ability of biological neural networks to stabilize memories in the face of changing network conditions, but also in the construction of nano-scale device architectures.

Although one rule can be utilized, it is believed that many other plasticity rules can provide a similar, if not a better degree of fault tolerance. The ability of a network to adapt to faults is a direct result of the attractor state of the network. Thus, if a plasticity rule can be found that contains a fixed point at a desired weight vector, the rule will display a degree of fault tolerance. What is interesting to note about rules like AHAH is that the same rule can provide for both powerful statistical analysis such as finding IC's useful for classification, and using the IC's to provide linearly separable outputs necessary for high degrees of fault tolerance in down-stream layers.

The rule's ability to find Independent Components and the requirement of linear seperability will be discussed later. Briefly, the rule working in a multi-layer network seeks to find the independent components of its input data and by doing so, creates linearly independent outputs. Thus, the linearly independent requirement is solved by the same rule working in a larger, multi-layer network.

Although it is not yet fully known what direction nanocomputation will take us, it is highly probably that architectures will be distributed and highly parallel. Because of this, rules like AHAH, which are entirely local and depend only on instantaneous values, can be very valuable. The simplicity of the rule makes it likely that direct physical mechanisms can be found to mimic the rule in a nanoscale device, making possible large self-repairing networks.

At this point, it is important to explain the application of dielectrophoresis (DEP) with respect to the physical neural network of the present invention. Once believed to fail at small scales, recent advances in semiconductor manufacturing technology have enabled researchers to develop electrodes capable of manipulating nano-scale particles. By suitable application of a voltage gradient and a changing electric field, one can exercise total control over particles in solution. This includes aggregation, dispersion, rotation and particle separation.

When conducting particles are immersed in a liquid and subjected to an inhomogeneous time-varying electric field, the particle will experience DEP below or above a critical frequency threshold. The particles move in the direction of an increasing or a decreasing field gradient until the critical frequency, and will move in the opposite direction above (below) the critical frequency. In a Knowm network, pre- and post-synaptic electrodes form electrode gaps. The electric field generated by pre- and post-synaptic neural circuitry precipitates particles from solution and they aggregate at the gap. The gradient and frequency dependence allows for control over connection formation and thus a mechanism for modifiable connects in a hybrid "wet" neural chip.

When a non-spherical object is suspended in an electric field it rotates such that the dipole along the longest non-dispersed axis aligns with the field. Rod-shaped particles will be attracted to regions of high field gradient under positive DEP and rotate to align with the connection direction thus forming wires that bridge pre-and post-synaptic electrodes. The magnitude and sign of DEP is dependant on the complex permittivity of both the suspended particle and solution. One can use DEP to separate particles. In a Knowm™ device this property can be utilized in a couple of manners.

It is known that various synapses within a nervous system behave in different ways. It is also known that certain Hebbian/Anti Hebbian plasticity rules lead to various statistical weight projections. By creating a chip with areas devoted to certain types of nanoparticles suspensions, or by creating mixtures of nanoparticles suspensions, or by modifying a feedback mechanism, connection properties can be tailored to a desired behavior.

Contaminants are generally not as conductive, or vary in their permittivity, from the desired nanoparticles. Thus ac-induced DEP can attract only the desired nanoparticles and leave contaminates behind. This creates cleaner connections. For example, an alternate form of a Knowm connection requires only semi-conducting nanoparticles. The DEP force has successfully been used to separate metallic from semi-conducting nanotubes, and can thus be used as a mechanism to sort nanoparticles on-chip to attain only the semi-conducting particles.

Many problems with serious commercial applicability are related to real-time signal processing of massive data streams. This type of problem is intrinsically solved in most moderately complex nervous systems, which are inherently fault tolerant and capable of superior performance with unreliable neurons and noisy data.

Within the next ten years, the theoretical limits of photo-lithography-defined circuits will be reached. As device dimensions enter the nano-domain, it is no longer simply a matter of packing more transistors into a smaller space. Inherently fault-tolerant devices will be needed that can process large amounts of data, quickly, from vast amounts of unreliable components. Because biological neural networks have solved exactly the same sort of problems we now face, it seems logical to take inspiration from nature.

Computation is a physical resource, and the brain allocates the resources in a way modern computers can never fully appreciate. The current trend in computing is towards more processors, since the limits (both physical and financial) of silicon are at hand. By doubling the number of processors, one can now process twice the information. This only makes sense, however, if the task one wishes to compute is a task such that the problem can be broken into pieces, with each computation independent of the others. The brain is the ultimate parallel computer: each of the 10,000,000 billion synapses is its own finite state machine. Any computation that a brain can perform is a task that can be parallelized. That is not to say that we know how to parallelize the computation, just that a solution is at hand if we can decipherer what the brain doing. Once one has a neural algorithm to solve a problem, the challenge is actually performing the calculations.

Figure 10:
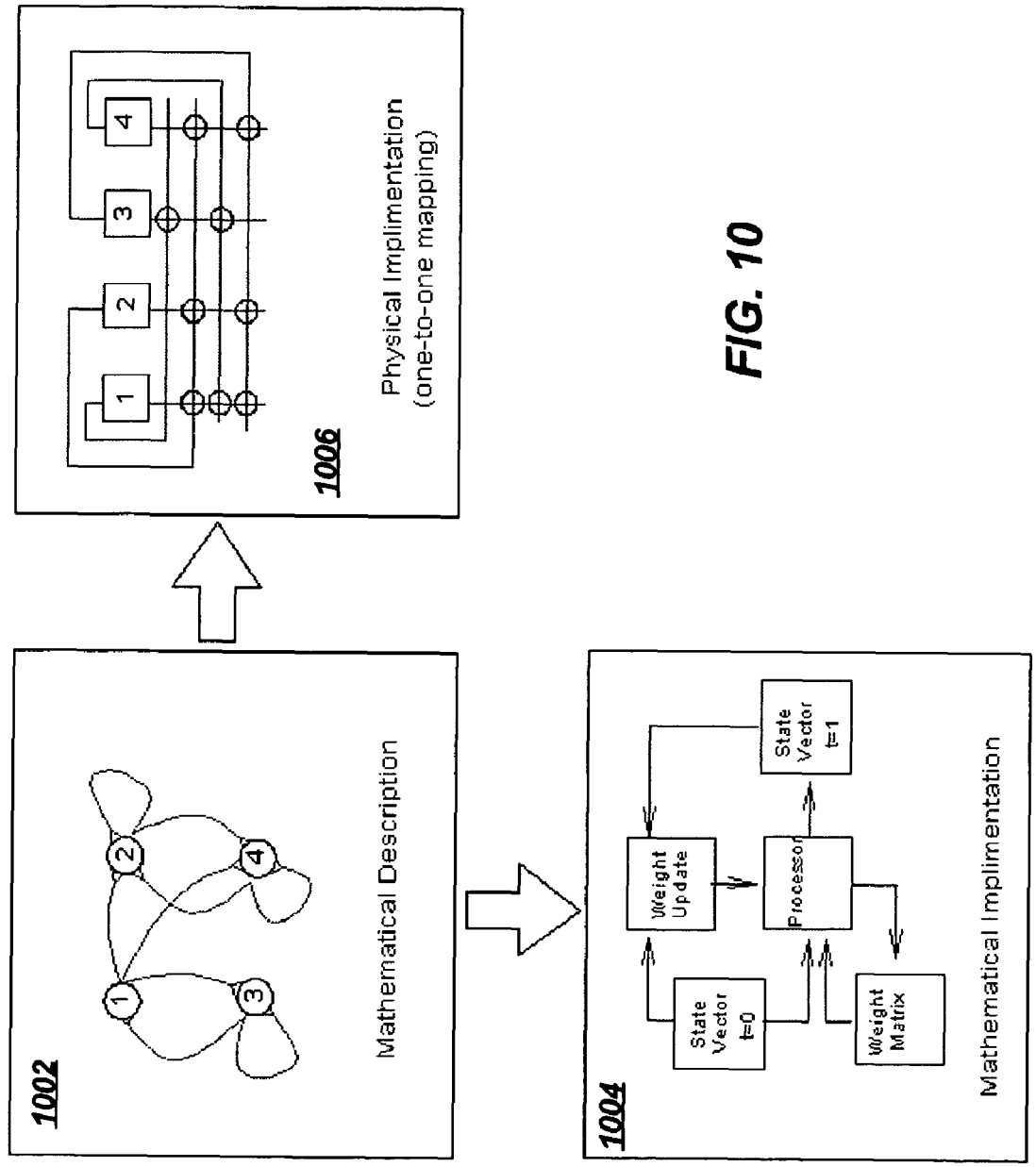
FIG. 10 illustrates a high level block diagram depicting the interaction between a physical neural network implementation, a mathematical implementation and a mathematical description in accordance with an embodiment of the present invention.

There are three ways to perform neural computation: Computer Simulation, Specialized Hardware Processors and Physical Networks. FIG. 10 illustrates a high level block diagram depicting the interaction between a physical neural network implementation as indicated at block 1006, a mathematical implementation as depicted by block 1002 and a mathematical description as depicted at block 1004 in accordance with an embodiment of the present invention.

Computer simulation fails for an obvious reason: A neural network gets its power from many individual neurons all working together at the same time. A computer can accomplish only one, or a few tasks, simultaneously. A computer, however, is exactly the wrong architecture for emulating a neural network. The phenomenal success and speed of modern computers has created the impression that with the current trend of performance increase, a personal computer will eventually be capable of running arbitrarily complex programs. What is not generally realized is that if the "arbitrarily complex program" is a neural network, the personal computer will have to rely on entirely different architectures. If the goal is to fit a neural network capable of biological performance into a small stand-alone chip that consumes little power, the solution is to forget about anything serial.

Hardware offers great advantage over software and computer simulation. Unfortunately, current VLSI architectures still cannot match the scale of biological networks because the fundamental building blocks (transistors) do not possess the correct physical attributes to emulate a synapse. For example, analog VLSI chips are very fast because the physical attributes of the chip components provide the mathematical functions of summation and multiplication. The problem of a modifiable connection, i.e. a plastic synapse, lies at the core of our current inability to build biological-scale networks. If a single transistor provided the same attributes as a plastic synapse, larger and more powerful networks can be built. Although single-transistor based synapses exist, they fail because their solid-state behavior is a poor match for most neural algorithms and simply too restrictive.

A physical neural network is simply a neural network in which the mathematical operations necessary to emulate the network, including the plastic nature of a synapse, are entirely accomplished by physical processes. In other words, synaptic attenuation, neural summation, activation, and synaptic modification are all physical properties of the network. A Knowm™ network is a physical network. Traditional analog neural networks use the tools currently available to emulate the function of a synapse, i.e. (transistors, capacitors, etc).

Industry is currently approaching chips with one billion transistors per square centimeter. This is on the same order of magnitude, and in some cases has surpassed, the number of neurons in biological networks. Yet the most important part of a neural network lies in its connections. From an electronic device point of view, the function of a synapse is more complicated than the function of a neuron because it both processes information (like a neuron) and also has a memory. What is needed is a nano-scale physical device that provides a modifiable electrical resistance. Dielectrophoretic aggregation of nano-wires as a physical mechanism therefore meets such requirements.

Plasticity is simply the ability to modify a connection strength. By what rules the connection is modified, be it supervised or unsupervised, is secondary to the fundamentally important requirement that the connection possesses in some way the ability to both strengthen and weaken. If a connection can be electrically modified in a relatively predictable way, and the connection is very small, then it is likely that it will find use in some sort of neural structure. After a potential connection is found, however, it is helpful to ask oneself exactly what types of algorithms the connection will be used for. In neural algorithms the connection dynamics are usually fairly slow and the connection values have at least 4-bit precision.

This type of behavior rules out certain types of nano-connections for practical consideration, except for rather specific applications. For example, consider two neurons connection by a variable connection. Perhaps the most extreme Nanotechnology solution would be to connect the two neurons with a single "switching" molecule. To attain more than 1-bit connection variation, more than one molecule would have to be used. This requires a more complicated structure that depends on the precise placement of individual molecules.

Although it is certainly possible that precise control over molecular placement will one day be available, their are many problems to overcome. It is relatively clear that if one is to build a nano-connection with reasonable variation it must be constructed out of more than one molecule or particle. This raises an interesting question. If more than one molecule is necessary anyway, why are "special" molecules (i.e. switching) necessary? Every molecule possesses an intrinsic resistance.

The more particles are bridging a gap, the less the resistance. If less resistance is needed, it then becomes a problem of how to get more particles to bridge the gap. If more resistance is needed, one needs a way to remove particles. It should be fairly intuitive that the problem of reliably "removing" and "attracting" particles to a precise location is impossible in a solid and (for all practical voltages) impossible in a gas or vacuum. Therefore, we have entered the realm of "liquid-state physics". The "connection problem" can be approached from this angle. Almost any particle and many molecules can be pushed, pulled and rotated by dielectrophoretic forces. In other words, instead of looking for very special molecules, almost any molecule or particle will work. By changing the way we think about a connection, we have opened up the playing field considerably.

In the age of solid-state physics and extremely sophisticated integrated circuits it seems ridiculous to even consider an electronic circuit based on particles floating around in a liquid. The dynamics seem completely orthogonal to what is-required of today's electronics. In a very real way, liquid dynamics are inappropriate for traditional computational structures (i.e. high-speed digital). Yet we face the interesting observation that all life on earth exists in a liquid. Computationally, biological networks are the result of molecular movement. Neurotransmitters float around and channels open and close, which allows for the movement of yet more molecules and ions. The point is not just that these systems exist in a liquid, but that the dynamics are only possible because things move in a liquid. If one wants to build a biological scale network, the connection must be small. If the connection is small, the dynamics (in terms of connection modification) must be slow. If it's an electronic system, then things need to move.

A Knowm™ network is a potential solution to building biological-scale neural networks as well as vastly miniaturizing current networks. The size of biological-scale networks precludes any "hard-coding" of synaptic strengths because even the most powerful computers cannot determine what the synaptic strengths should be. Synaptic modification is a dynamic process anyway, so hard-coding is very much out of the question. Without the ability for connections to obey a plasticity rule, with every connection adapting in parallel, large functional networks cannot be built. Indeed, the functionality they inherit lies in the way synaptic strengths are modified.

A plasticity rule that is non-local will not practically work for large networks. Ideally, the only information a synapse should use to modify its strength is the pre- and post-synaptic neural activations. In other words, the plasticity rule needs to be unsupervised. Although a Knowm Synapse can be "coaxed" into behaving like a supervised connection, the basic idea is that any artificial synapse (and any biological synapse for that matter) only has two terminals.

Take for example the basic building block of all modern electronics: the transistor. A transistor is basically a valve. By controlling the base voltage, one can control the current flow through the source and drain. This is certainly a modifiable connection. The problem is providing the correct base voltage, at the correct time, to emulate the desired plasticity rule. One will have to design an additional circuit, which takes as its input the pre-and post-synaptic terminals and provide as its output the base voltage needed keep the transistor conductance at the appropriate level (as determined by the plasticity rule).

As it is, an individual transistor is still far too large to replace a synapse because having a third terminal requires that one do something with it, and any extra circuitry is too much circuitry when one is trying to implement billions of synapses as well as millions of neurons. What is needed is a connection that is both small and possesses the ability to modify its strength based on pre- and post-synaptic states. In an electronic structure this is equivalent to pre- and post-synaptic voltage signals. The fact that a Knowm™ connection can be controlled by a static gradient and a dynamically changing electric field, in a very predictable and precise way, means that a Knowm™ connection is an ideal solution for many types of plasticity, both static and dynamic.

There are really not too many choices in what one uses to connected pre- and post-synaptic electrodes. One must either use molecules suspended in air, in a solid, or in a liquid. Knowm™ represents a solution in a solution, and it is the liquid suspension that makes possible the properties we desire. Besides the dynamics of connection modification, there are some other important properties a Knowm™ connection must have.

Biologically speaking, a synapse is the junction between a pre-synaptic terminal (the axon) and a post-synaptic terminal (the dendrite). Because of the chemical nature, the connection is one-way. Signals can only travel from axon to dendrite. Electrically, a network of neurons must be connected by a "matrix" of electrodes. Without a one-way connection, this matrix no longer represents a structure that reliably routes the pre-synaptic signals to the appropriate post-synaptic electrode, but a very large "percolation" resistive network. Such feature can be utilized in structures such as an "artificial retina", but it is hardly appropriate for directing neural signals.

It is thus necessary for the connection to behave like a diode and only conduct in one direction. A number of methodologies can be implemented for accomplishing such a diode functionality. For example, by properly doping the nanoparticles and the pre- and post-synaptic electrodes one can imagine a diode-like connection. It is believed that the dielectrophoretic assembly of certain types of nanoparticles can create a one-way connection. Although the mechanism is not yet fully understood, the result is indeed a one-way connection from dielectrophoretically-aligned particles between two electrodes (of the same material). This diode-like behavior is definitely surprising, but the results are certainly there and the property is vital for a successful neural network.

In-situ conduction is fundamentally important to the success of a Knowm synapse and certainly not easily answered from a theoretical standpoint. However, experimental evidence is now at hand that can answer this question. For some time, interest in the dielectrophoretic manipulation of nanoparticles was directed toward positioning the particles as an intermediate step to final device fabrication. Although it has been demonstrated that electrical contact can be made with gold nanowires in situ, and also demonstrated some basic dependencies on connection formation rate, such connections are too large and conductive for a Knowm™ implementation.

A Knowm™ connection must be much smaller, less conductive and composed of many wires (for greater resistance variation). Other studies at the same time revealed the clear alignment of nanoparticles such as nanotubes and nanowires, but failed to take in situ conductance measurements. As the dimensions become smaller and enter the nano-realm, it is generally believed that Brownian motion would overcome the dielectrophoretic force. With dielectrophoresis now being used to position individual molecules, this belief has certainly been overturned. But how will nanoparticles and the dielectric solvent interact in terms of electrical conduction?

It is entirely possible that a solvent layer between the nanoparticles and electrode will prevent electrical contact. Matching of the electrode material to the chemical functional groups of the nanoparticles should play a very important role in electrical contact, as well as the capacitance of the electrodes. There are more questions of this nature, but the variables are numerous and until recently the facts have been few and far between, so answering them is much more of an experimental question than a theoretical one. The answer is that almost everything is a variable, but these variables can be controlled and an electrical connection can be made in situ at extremely small dimensions. The connection dynamics are tamer and more controllable can be imagined. In fact, the scaling properties of a Knowm™ connection are quite promising.

The dielectrophoretic force is dependant on the field gradient, often expressed in volts per meter. As the dimensions decrease, a smaller voltage is required to produce the same field gradient. Although a larger field gradient is required to overcome Brownian motion, theoretical work indicates that sub-10 nm particles can be trapped within a 10 nm electrode gap with less that 1 Volt. The resistances of a Knowm™ connection would most likely be measured in giga-ohms, depending on the nanoparticles. With this resistance, the power dissipation per connection would be in the pico-watt range.

If one assumes that twenty percent of the Knowm™ connections are active at any given time, the power dissipation for a fully connected million-neuron connection network is about 1 watt (1 trillion connections). It is unlikely that a Knowm™ connection would ever need to scale beyond 10 nm. As the electrode gap decreases, fewer particles are needed to saturate the connection. This will result in decreased resistance variation. As most of today's neural algorithms require a higher degree of weight variation, such a dramatic scaling is unnecessary until we have a better understanding of biological neural systems. It is already known that biological synapses have relatively low precision and are probabilistic transmitters. Thus, once we understand biological neural networks it is very likely that a Knowm™ synapse can be scaled down to truly molecular scales.

There have traditionally been two modes of thought behind teaching neural networks. Either one directly teaches the network with a supervised algorithm, or one tries to build a network that teaches itself with an unsupervised algorithm. The Knowm™ connection lends itself to the later, as the control over the connection is a function of pre-and post-synaptic electrode signals. Recent work is indicating that a strict separation of the two types of neural learning is not required and one will actually benefit from a combined supervised/unsupervised approach.

To illustrate this point, it is necessary to obtain a better feel for how an unsupervised rule functions. It has been shown that Hebbian learning amounts to principal component analysis of the input data. Although in some limiting examples the principle components are useful for classification, one is generally interested in high-order features. For example, imagine that a network is being presented with images, and a layer of neurons with receptive fields in the image space. In other words, each neuron receives input from a subset of all image pixels.

It has been shown that the neurons, under the influence of a higher-order unsupervised learning rule, will form feature detectors such as edge filters. These filters (the weight vectors of the neurons) represent a sparse basis set and have been compared, and in some cases proven to be, the independent components of the data. It certainly seems like more than a coincidence that the primary visual cortex of most animals consists of edge and line selective neurons! One important observation is that a rule like Hebbian learning will not extract such features because the features exist in the phase space, not in the power spectrum of the image.

In other words, Hebbian learning determines which "pixels" are most active, but may not explain which combinations of pixels are correlated with each other. To prove to oneself that the information does lie in the power spectrum, a pre-whitening of the data can be performed to eliminate first-order statistics. If this is done, the picture will still be recognizable. If one performs a pre-whitening to eliminate phase information, the picture will look like static! So it is understandable that the representations an unsupervised (higher-order) learning rule converges to is a set of features that are useful for classifications. In other words, an unsupervised rule can be found that does exactly (or very close to) what a supervised rule will do, i.e. perform a higher-order statistical analysis of the data.

So how does all of this relate to a Knowm™ network? Picture a Knowm™ synapse. The synapse is a connection formed by the aggregation of particles floating around in a liquid. By application of appropriate voltage signals, the connection can be strengthened and weakened. But the basic picture is one of a dynamical system. Particles are being pushed and pulled in many directions and it is the group behavior that determines the over-all connection properties. So one does not actually "update" a connection value. It is perhaps more accurate to speak of "pushing" and "pulling" the connection in different directions. Unsupervised learning can be seen in the same light, as it the rule "pushes" and "pulls" the connection values until they reach stable points characterized by some statistic of the input data.

Thus, an unsupervised learning rule is unavoidable. The dynamic nature of the connection will require, to some extent, an ever-present restoring force keeping the synaptic values from dissolving. The problem is that one usually wants to teach the network how to perform (i.e. associate the correct labels with the data). But a supervised and an unsupervised rule can be made to match. Recent work indicates that it is possible to teach a network in a supervised way and keep the network stable with an unsupervised rule. The dynamics of the connection provide a high degree of "stable adaptation" capable of reconfiguring connections to track non-stationary data. This is a bit ironic because particles in solution bring to mind the notion of instability. The reality is that such a connection can be more stable and powerful than other physical implementation because the fixed point (i.e. energy minimum) of the system is a weight vector that solves the problem.

When one desires to consider a nanotech implementation of a neural network, the first question one should asks is "what type of neural network?" A physical implementation necessarily requires a match between algorithm and device physics. Consider, for example, trying to build a truly nano-scale neural device. As the devices become smaller, the problem of sourcing current to many other devices limits the amount of fan-in or fan out. This is certainly the case with devices such as single-electron transistors (fan in <10, fan out <3).

Such restrictions require new algorithms to be developed that perform under the physical restrictions of the device. In the case of a neural system, a limit in the fan in and fan out are serious restrictions. It is perhaps better to think of such devices for applications in nearest-neighbor cellular automata, and indeed much research is being done in this direction. A reasonably convincing argument from biology is simply the following: Our brains dissipate twenty percent of our body's resting energy and most of this energy is lost through signal transduction. If the types of problems biological networks can solve can be accomplished with only local connections (i.e., less than 10), nature would have done this. Indeed, nature has had millions of years to optimize computation and energy consumption. From an information processing perspective, it is simply more efficient to have more connections.

A nano-scale neural architecture should possess nano-connections, but neural implementations must be large enough to allow for larger fan-in and fan-outs. It is often unnoticed that when it comes to neural systems, the problem is simply connecting the neurons. If the fundamental device is a single-electron transistor, one is faced with two problems. First, algorithms need to be designed to match the physical restrictions of the device. Second, when one has a novel molecular device, how does one actually assemble all the pieces?

Knowm™ is very unique in that it simultaneously solves these problems. The device physics embody a type of iterative learning common to many neural algorithms. At the same time, the force responsible for connection modification also allows self-assembly. With Knowm technology it should be possible to create a chip that emulates well-understood algorithms, offers a tremendous performance increase over current technology, holds promise for future algorithms based on alternate feedback mechanisms-and most importantly-assembles itself.

Communication is the biggest bottleneck in a neural network. Indeed, a neural network is the physical embodiment of communication. All VLSI structures today struggle with inter-neural communication and have dealt with the problem is various ways. One solution is to ignore it by simply restricting the topology to locally connected nodes (such as with SET's). Other solutions involve exploiting the extremely fast communication in modern VLSI by using the same wire to connect multiple neurons. Such event-driven and addressable structures suffer from many of the same problems as other VLSI systems.

In the end, the problem is abstracted to a solution space that limits the networks growth. For example, by sharing the same wires, the neurons will eventually interfere with each other when they fire at the same time. As coherent oscillations have been found in many biological networks, and oscillations have been used successfully in image segmentation, a structure that cannot cope with coherent oscillations would be a poor solution. Alternately, a mechanism can be built that prevents neurons from using the same wire at the same time. But again, this forces a bottleneck in the system. In the end, the best way to build a neural network is to connect all the neurons with dedicated wires. The tools of modern VLSI have limited this, but a Knowm™ connection can make it possible. Of course, it is not only a matter of making a connection. The connection must be extraordinarily small and is preferably unidirectional should also obey a plasticity rule.

How much control over a Knowm™ connection is necessary and what can be utilized to modify such a connection? The answer is fairly simple. The more control one possesses over the connection, the better. Consider, for example, Hebbian learning. In its simplest form, Hebbian learning modifies weights according to a simple rule, $\Delta W = l_{rate} XY$, where X is the pre-synaptic input and Y is the post-synaptic output and $l_{rate}$ a learning constant. In a physical network, X and Y may be thought of as a voltage, current, frequency or perhaps even a phase in an electrical signal.

A vital feature of Hebbian learning is its multiplicative nature, or more specifically, the necessity that the physical quantities that represent X or Y be able to take on negative values. Mathematically, this can result from either a negative input "X", or a negative output "Y". Physically, this is a difficult task. If one can find a physical connection that can be strengthened and weakened by pre- or post-synaptic activity, then this connection can be used to emulate most plasticity rules (subject to the temporal nature of connection modification). A feedback mechanism, presumably within the neural circuit, can provide the necessary signal for connection modification.

A Knowm™ connection is a physical connection that can be controlled by pre- and post-synaptic electrode activity. There actually exist many possible encoding mechanisms, but lets see if we can re-create a Hebbian form of plasticity with a pure frequency-encoding scheme. In the presence of an electric field, a particle of radius r feels a force given by the following equation (14):

$$F_{DEP} = 2\pi r^3 \epsilon_m Re[K(\omega)] \nabla E^2 \quad (14)$$

The basic idea behind a Knowm™ synapse is that particles suspended in a medium with permittivity $\epsilon_m$ will be attracted to a 'connection' gap between the pre- and post-synaptic electrode under certain conditions, and repelled from the connection for other conditions. A tremendously valuable property of the dielectrophoretic force is the frequency dependence contained in real part of the Clausius Mossotti factor, $Re[K(\omega)]$, given by equation (15).

$$K(\omega) = \frac{\epsilon_p^* - \epsilon_m^*}{\epsilon_p^* + 2\epsilon_m^*} \quad (15)$$

Figure 11:
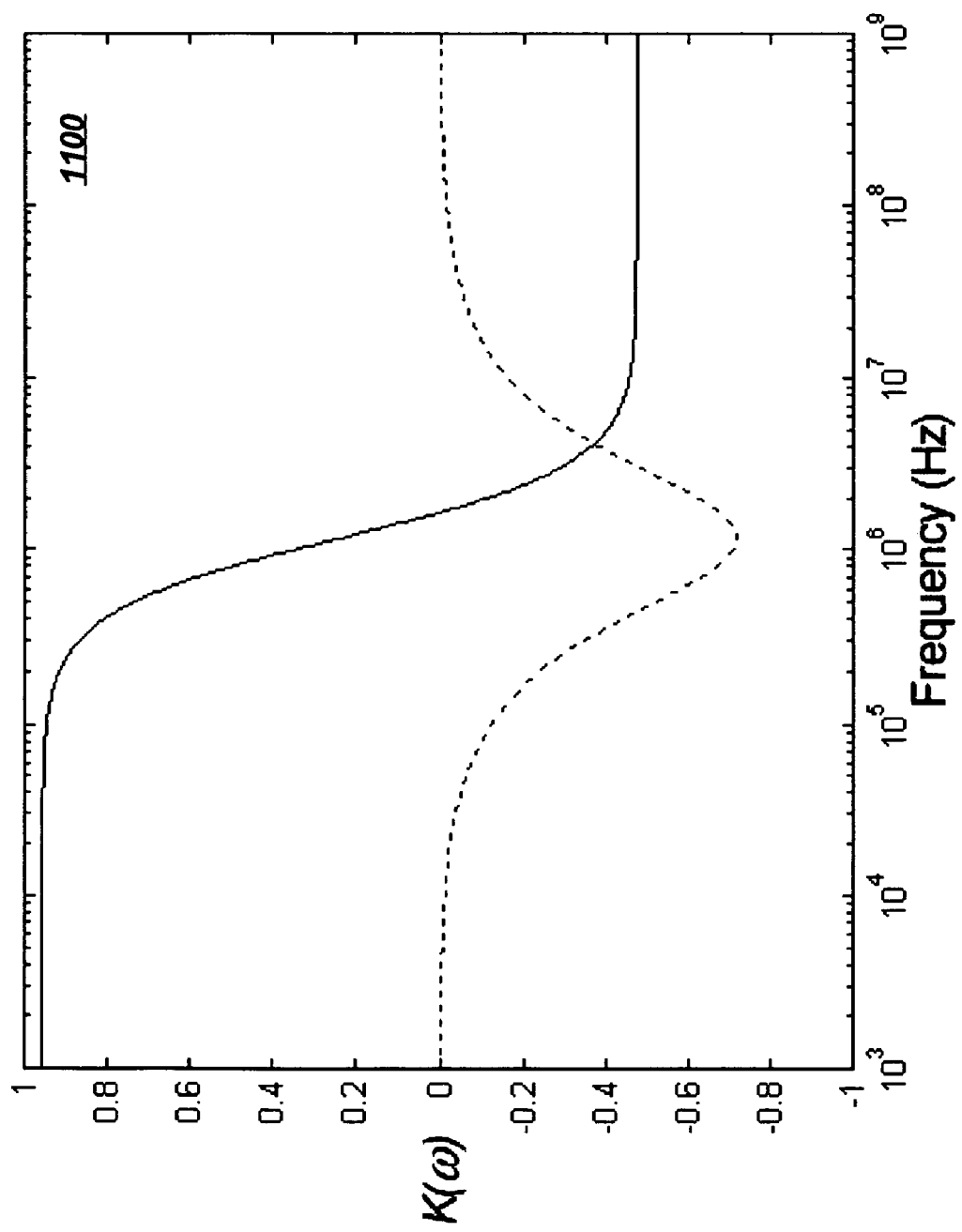
FIG. 11 illustrates a graph of angular frequency versus frequency in Hertz, which can be adapted to illustrate an embodiment of the present invention.

In equation (15), the variables $\epsilon^*_m$ and $\epsilon^*_p$ represent the complex permittivity of the medium and particle respectively and $$\epsilon^* = \epsilon - \frac{j\sigma}{\omega}$$

with $\sigma$ the conductivity, $\epsilon$ the permittivity and $\omega$ the angular frequency of the applied electric field. In the case of a Knowm™ synapse, the particle (in some instances) is more conductive than the suspension, so this restricts us to positive dielectrophoresis for lower frequencies and negative dielectrophoresis for higher frequencies. A typical case can be seen in graph 1100 of FIG. 11 below, where the real part of the CM factor is generally drawn as a solid line.

Although it is apparent from the force equations that the connection can exhibit a frequency and gradient dependence, an explanation can be provided with respect to how the conductance of a connection changes with respect to an applied signal. Resistance modification represents one potential area for explaining how the conductance of a connection can change. For illustrative purposes, assume that the change in conductance of a connection is linearly proportional to the dielectrophoretic force as indicated by equation (16):

$$\frac{d\Omega}{dt} = k((2\pi r^3 \epsilon_m Re[K(\omega)] \nabla E^2)) \quad [16]$$

If equation (16) is true, we would expect that the conductivity of a connection to change linearly with time if a constant alternating electrical frequency with constant magnitude was applied. This can be seen in the following plot, where carbon nanotubes are aligned within inter-digitized electrodes suspended in, for example, ethanol.

Figure 12:
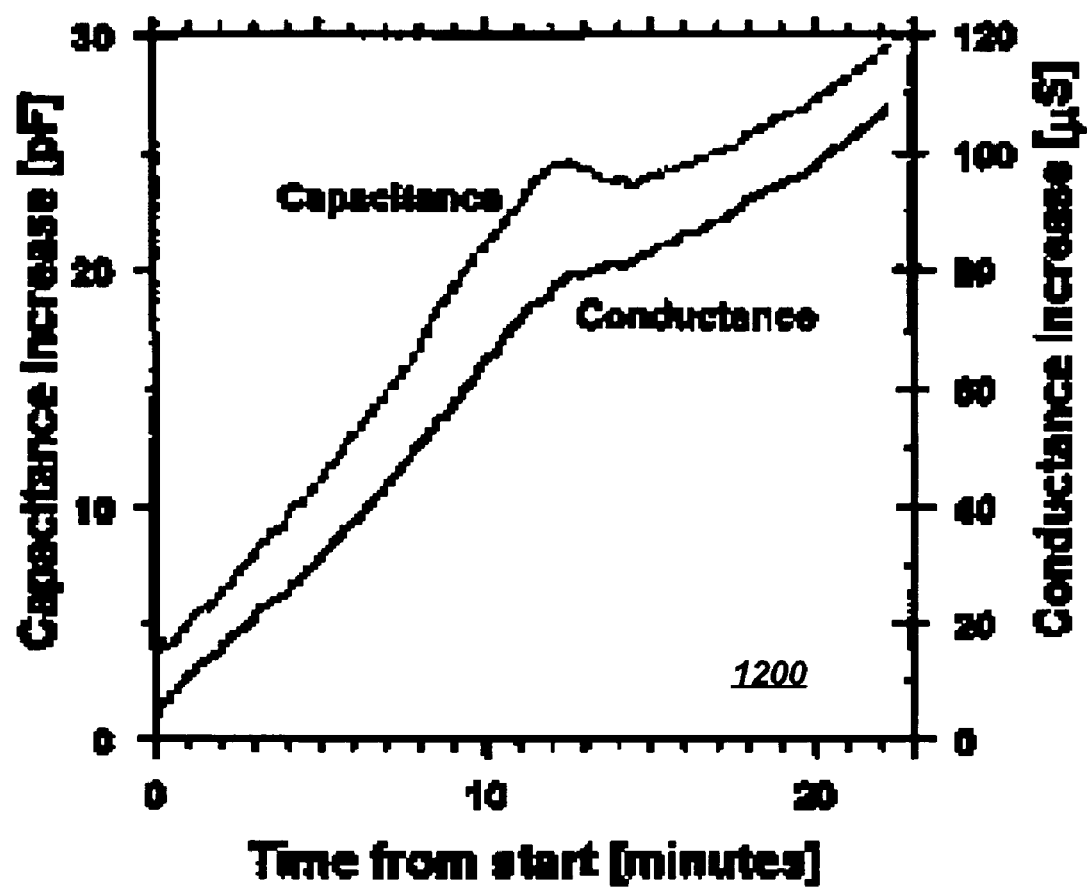
FIG. 12 illustrates a graph of capacitance versus time, which can be adapted to illustrate an embodiment of the present invention.

FIG. 12 illustrates a graph 1200 of capacitance versus time, which can be adapted to illustrate an embodiment of the present invention. Although other non-linear cases exist, one can see that mostly linear dependence is possible. By increasing the applied voltage from 2V, or by decreasing the connection gap, one can substantially reduce the time necessary to modify the connection. However, this is not absolutely necessary. Most neural algorithms modify connections strengths only gradually and are intentionally limited by a learning parameter, $l_{rate}$, where $l_{rate}$ is typically very small. Alternately, the concentration of the nanoparticle suspension can be varied to increase or decrease connection build up.

A simplification of equation [16] shows that Hebbian learning is indeed possible if one is limited to two-quadrant multiplication (pre-synaptic input always positive), where variable "X" is given by a voltage and post-synaptic variable "Y" is a variable frequency.

$$\frac{d\Omega}{dt} = K(Re[K(\omega)] \nabla E^2) = l_{rate} XY \quad [17]$$

$$k 2\pi r^3 \epsilon_m \to l_{rate}$$

$$\text{Re}[K(\omega)] \to Y$$
$$\nabla E^2 \to X$$

It is certainly apparent that the dielectrophoretic dependencies allow for Hebbian learning. However, Implementing Y as a variable frequency presents problems in CMOS technology. Although Voltage-to-Frequency circuits exist, they are large and not as accurate as desired. A goal is to keep all neural circuitry as small as possible. It would be better to produce any frequency signals off-chip and route these signals to affect the connection. Indeed, one can do just this. Consider again the case of Hebbian learning. The activation, Y, of the neuron can be given as $$Y = f\left(\sum_{k=1}^{N} I_k - \theta\right) \quad [18]$$

Where f(·) is some activation function that acts on the summed currents though N synapses, $I_k = V_k C_k$ and $\theta$ is a threshold, where $V_k$ is the voltage from the $K^{th}$ input and $C_k$ is the conductance of the $K^{th}$ weight. A function H(·) can be defined such as indicated below in equation (19):

$$H(Y) = \text{sign}(Y) \quad [19]$$

Physically this corresponds to, for example, a routing circuit that directs two different signals. If Y is positive, then a low frequency signal is routed to the post-synaptic electrode to induce positive dielectrophoresis. This will strengthen the connection and allow for positive multiplication. On the other hand, if Y is negative then the routing circuit will direct a high frequency signal to induce negative dielectrophoresis and weaken the connection (negative multiplication). Whereas H(Y) controls the sign of the update, a DC bias controls the magnitude of the update. Such a circumstance is illustrated in graph 1300 of FIG. 13.

Figure 13:
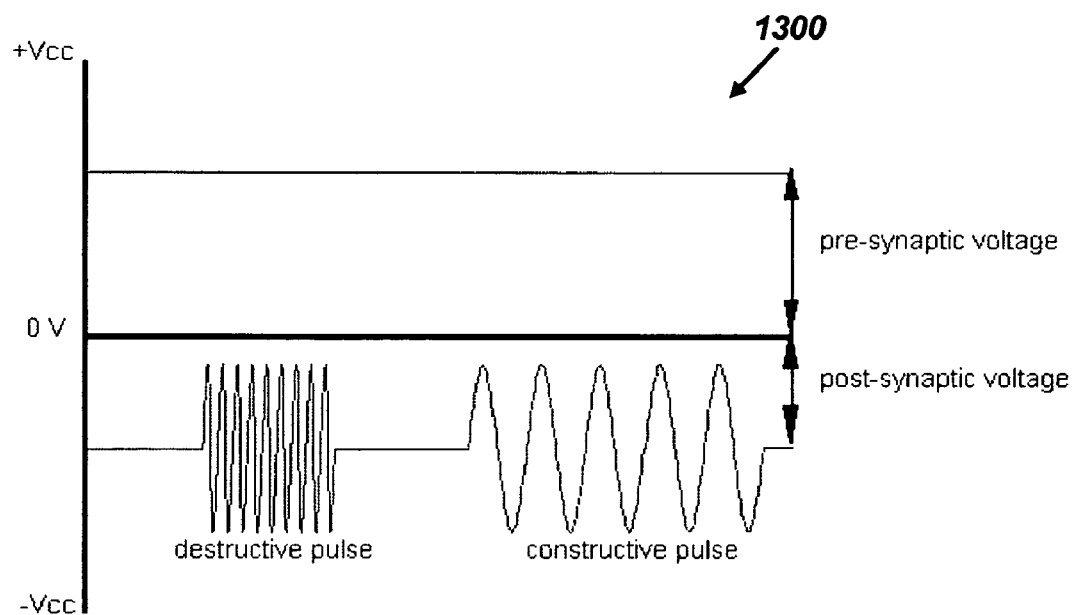
FIG. 13 illustrates a graph depicting data illustrating two-quadrant control over a Knowm™ connection, in accordance with an embodiment of the present invention.

FIG. 13 illustrates a graph 1300 depicting data illustrating two-quadrant control over a Knowm™ connection, in accordance with an embodiment of the present invention. As indicated in graph 1300, given a reference voltage, the pre-synaptic voltage, $V_{pre}$, controls the pre-synaptic contribution to connection formation, the post-synaptic DC bias, $V_{post}$, controls the post-synaptic magnitude to the weight update, and the post-synaptic frequency, H(Y), controls the sign of the post-synaptic weight update. Thus, two-quadrant multiplication is achieved by routing two externally generated signals and saving the cost of a current-to-frequency function for each neural circuit. Assuming linear dependence, the general connection update takes the form, where $f(V_{pre}, V_{post})$ represent a non-linear transformation of the input signals into a post-synaptic bias and frequency voltage signal.

$$\frac{d\Omega}{dt} = k \cdot H(Y) \cdot f(V_{pre}, V_{post}) \quad [20]$$

Two-quadrant multiplication as depicted in FIG. 13 is sufficient for any neural implementations provided inhibitory inputs are treated separately. A general diagram of such a circuit is depicted in FIG. 14, where excitatory and inhibitory inputs are treated separately.

Figure 14:
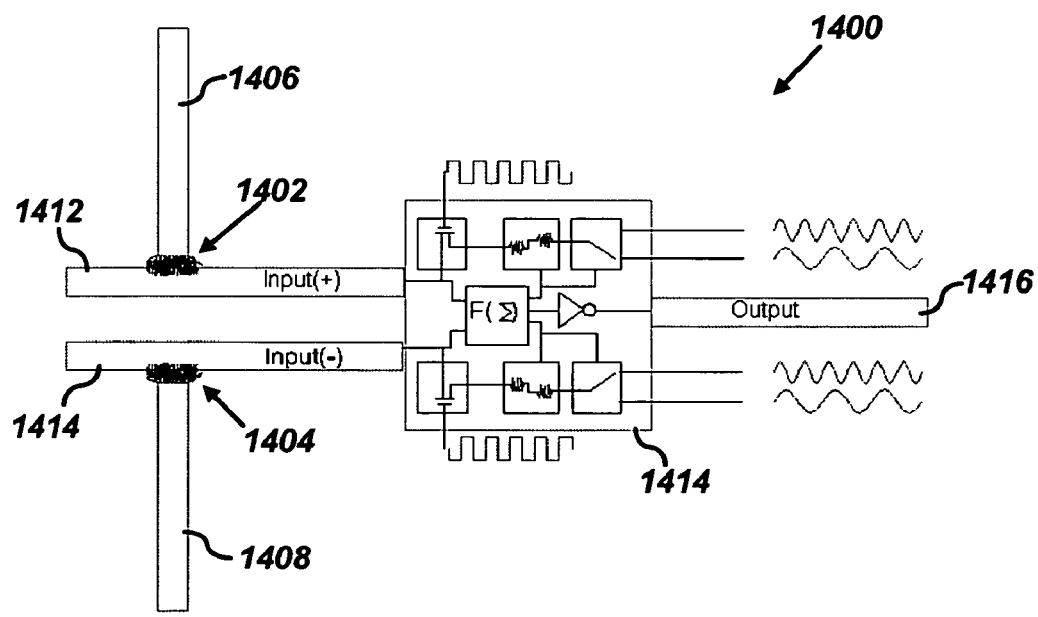
FIG. 14 illustrates a schematic diagram of a two-quadrant multiplication circuit configuration for a neural implementation, which can be implemented in accordance with an embodiment of the present invention.

FIG. 14 illustrates a schematic diagram of a two-quadrant multiplication circuit 1400, which can be utilized for a neural implementation, in accordance with an embodiment of the present invention. Circuit 1400 generally includes a positive input electrode 1412 and a negative input electrode 1414. An electrode gap is located between positive input electrode 1412 and an electrode portion 1406. Similarly, an electrode gap is located between negative input electrode 1414 and an electrode portion 1408. A plurality of nanoparticles 1402 can be suspended in a solution between the electrode gap located between positive input electrode 1412 and electrode portion 1406. Similarly, a plurality of nanoparticles 1404 can be suspended in a similar or identical solution in the electrode gap located between negative input electrode 1414 and electrode portion 1408.

Nanoparticles 1402 and 1404 can be exposed to time-varying electric fields and can also experience a dielectrophoretic force. Such a force can be used to attract and repel nanoparticles in the respective electrode gaps. The electrical resistance across the gap is dependent on the relative number of nanoparticles bridging the gap (e.g., more particles, less resistance and visa versa). At a basic level, this particle bridge can be thought of as a synapse. Circuit 1400 additionally includes an output electrode 1416, which produces data generated from neural network support circuitry 1414.

One important observation is that a number of functions of circuit 1400 can be easily constructed utilizing a few transistors. Arbitrary plasticity rules can be implemented by suitable characterization of nanoparticles 1402 and 1404 and relatively simple transistor circuits (amplifiers, routers, etc) can be provided by neural network support circuitry 1414. Although circuit 1400 is relatively compact, the dielectrophoretic force allows for further simplifications, while retaining and even gaining functionality. Circuit 1400 can be implemented in the context of a Knowm™ network.

The dielectrophoretic force can be dependant on both the conductance and permittivity of the nanoparticle and medium. In the case of an insulator, the conductance is negligible and the dielectrophoretic force is dominated by the effective moment of the dielectric particle. Thus the relative permittivity of the particle, $\epsilon_p$, and the medium, $\epsilon_m$, controls the sign of the Clausius-Mossotti function. In the case of a conductor, the Clausius-Mossotti factor is dominated by the conductivity of the particle and medium, $\sigma_p$ and $\sigma_m$, if the timescale of the changing electric field is smaller than the relaxation time constant associated with the accumulation of free charge at the surface of the particle. This is known as the Maxwell-Wagner relaxation time constant:

$$\tau_{MW} = \frac{\varepsilon_p + 2\varepsilon_m}{\sigma_p + 2\sigma_m} \quad (21)$$

In the limiting cases it can be shown that the effective moment of the particle, and therefore the force, is provided by the following formulations:

$$P_{eff}(t) = 4\pi\varepsilon_m R^3 \left(\frac{\varepsilon_p - \varepsilon_m}{\varepsilon_p + 2\varepsilon_m}\right) E_0 \quad (22)$$

$$t \ll \tau_{MW}$$

-continued $$P_{eff}(t) = 4\pi\varepsilon_m R^3 \left( \frac{\sigma_p - \sigma_m}{\sigma_p + 2\sigma_m} \right) E_0 \quad (23)$$

$$t \gg \tau_{MW}$$

Thus, in the lower-frequency regime, two particles with the same permittivity and varying conductivities will be pulled in opposite directions by dielectrophoresis. This can be exploited with semi-conducting particles, where a "gate" voltage can control the conductivity of the particle. Such semi-conducting particles can be implemented, for example, as nanoparticles 1402 and 1404 depicted in FIG. 14. For example, consider the behavior of a semi-conducting particle under no influence from the gate electrode (green in figure below). If the medium is chosen so that at frequency $f_0$ the particle is experiencing negative dielectrophoresis ($\epsilon_p < \epsilon_m$), then by application of a gate voltage the particles in the vicinity become conducting and the same applied frequency will cause positive dielectrophoresis.

This property can be utilized in two ways. First, the connection can be modified without an applied gate voltage by two frequencies (as previously discussed). Although a connection has formed, the resistance is still very high. Only by application of a gate voltage will the connection conduct. This property can be used for "genetic" neural algorithms, where the ability to turn a connection off is necessary for evolutionary exploration of connections. Second, this property can be exploited to further reduce the circuitry necessary to exercise two-quadrant multiplication by eliminating the need for two separate control frequencies. In other words, a gate voltage controls the sign of the connection update and only a single feedback frequency is necessary.

One can see from the previous examples that designing circuitry for connection modification is really not very difficult. The DEP force allows for many possibilities, and the above examples represent just a few. For example, the DEP force does not have to be a pure frequency. The DEP force is a result of moving charges and induced dipoles. Although the time-averaged force can be calculated by assuming sinusoidal signals, individual pulses will also work. The DEP force is really dependant on the rate of change of the electric field; one can see how shaped pulses of varying magnitude can be used for connection modification. This opens up the possibility of pulsed neural networks and Spike Timing Dependent Plasticity. Electrostatic attraction and repulsion, temperature variation, and hydrodynamic forces are all potentially useful in designing plasticity mechanisms. Over all, the dynamics available to us when particles are in solution creates many possible ways to effect Knowm™ connections at many different time and distance scales.

The development of Knowm™ network is inextricably linked to the Network architecture. With current CMOS technology, pre- and post-synaptic electrodes will be limited to widths of about 100 nm. Given the size of the nanoparticle used, an electrode gap on the order of 100 nm can represent a very discrete connection (nanoparticles≈100 nm) or a much more continuously variable connection (particle≈10 nm). Whatever the case, the dynamics of the connection will be relatively slow and suitable for "iterative" forms of connection modification.

Figure 15:
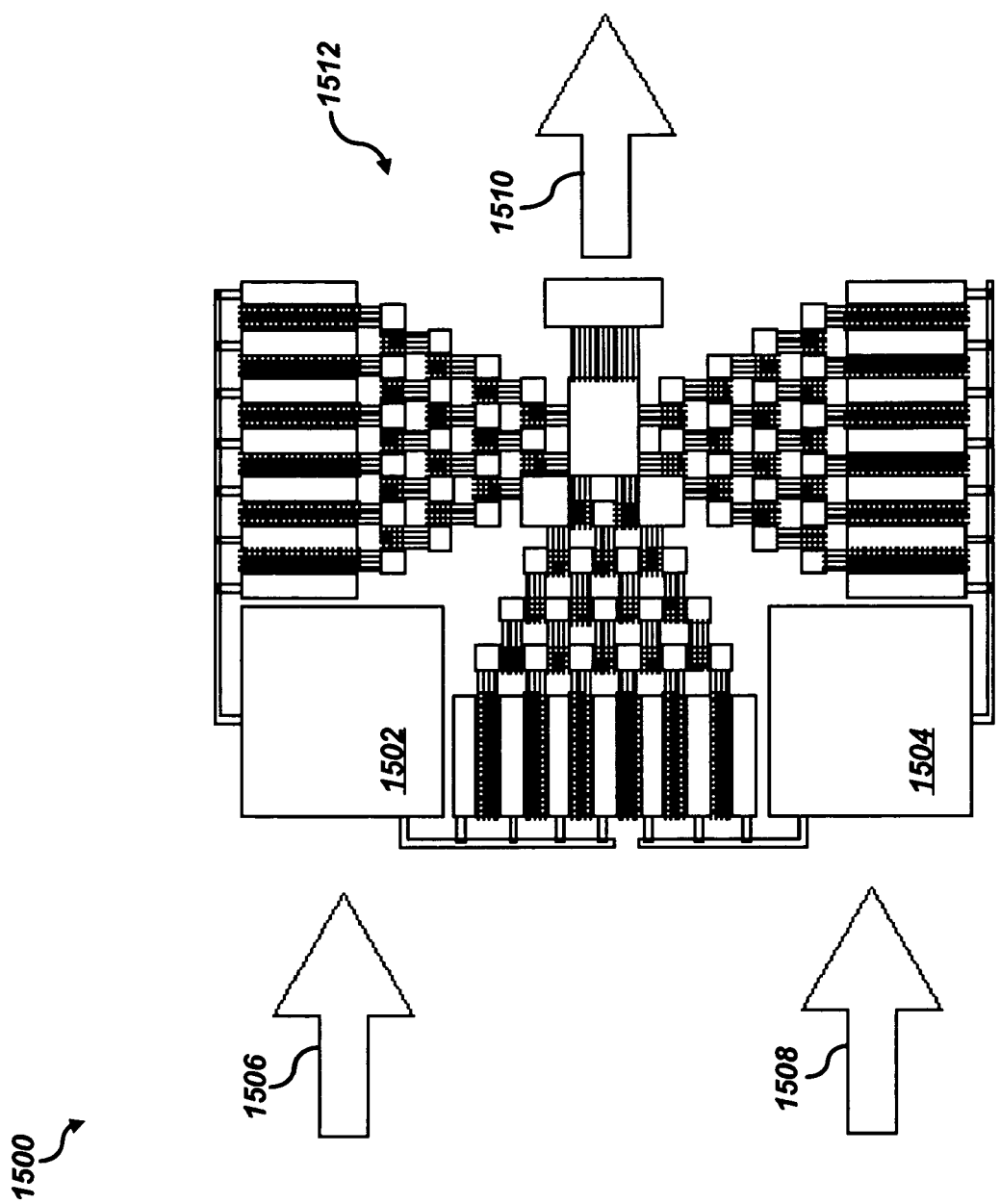
FIG. 15 illustrates a schematic diagram of a Knowm™ network, which can be implemented in accordance with an embodiment of the present invention.

FIG. 15 illustrates a schematic diagram of a Knowm™ network or system 1500, which can be implemented in accordance with an embodiment of the present invention. The fact that complicated synaptic dynamics are now represented by a connection on the order of 100 nm² moves the challenges of implementation back to the neurons. To form a connection, a pre-synaptic electrode must be brought close, but not touching, a post-synaptic electrode. This requires a much more geometric representation of the network on the chip. As one can see from system 1500 of FIG. 15, the network topology can always be utilized advantageously to design a more efficient chip layout.

System 1500 generally includes a plurality of inputs, represented by arrows 1506 and 1508 and a system output represented by arrow 1510. Circuit portions 1502 and 1504 can receive data input as indicated by arrows 1506 and 1508 and further communicate with a plurality of electrical component 1512, some of which can be configured as nanotechnology-based physical neural network connections and/or related Knowm™ components thereof. In the particular embodiment depicted in FIG. 15, a feed-forward network with over-lapping local connections can be condensed into a 2-D layout. It is apparent from FIG. 15 that network design takes on a more intuitive feel, as the network topology is clearly visible in the example physical chip layout depicted in FIG. 15.

Figure 16:
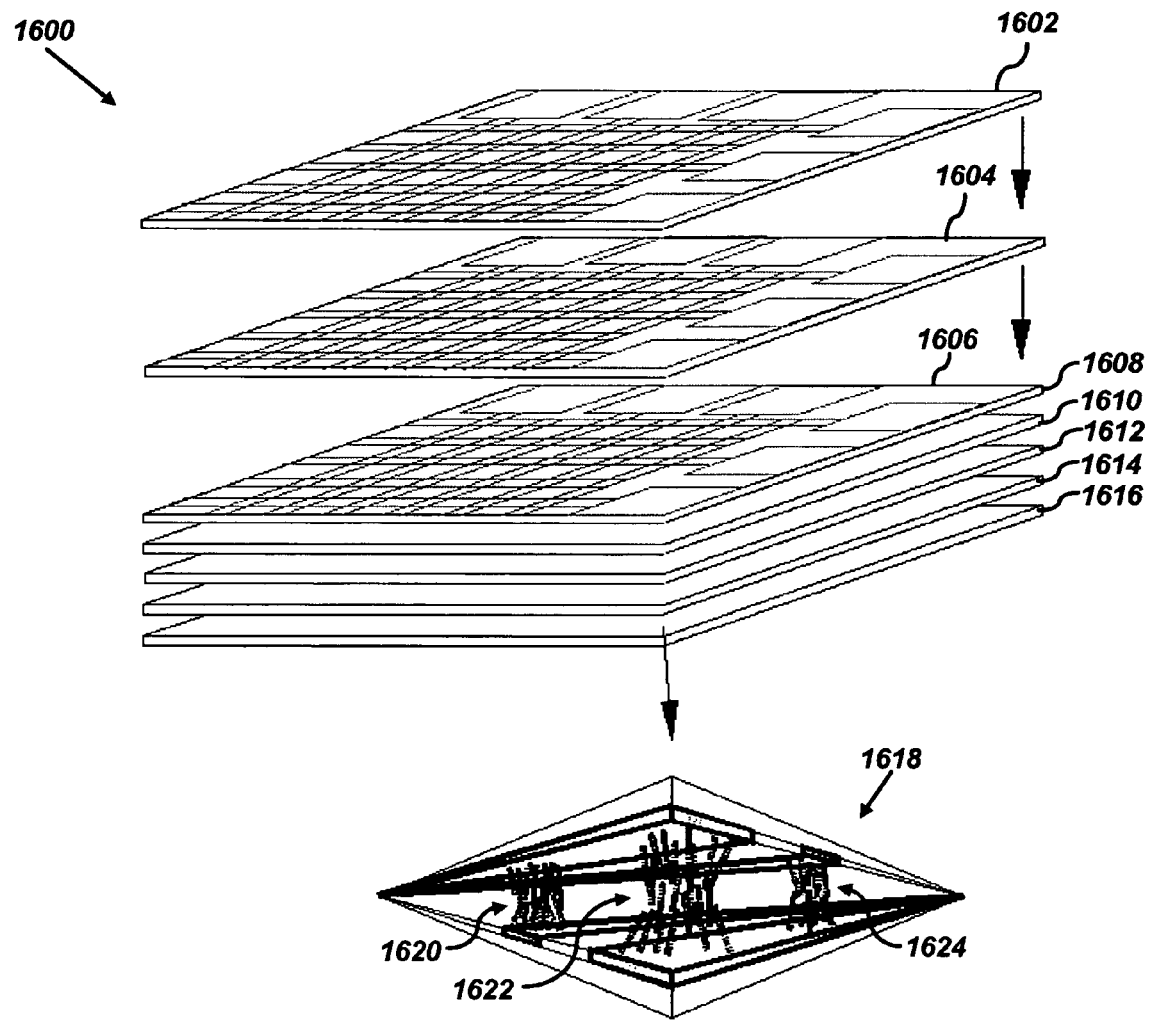
FIG. 16 illustrates a high-level pictorial diagram depicting chip stacking with vertical Knowm™ connections, in accordance with one embodiment of the present invention.

One very intriguing aspect of a Knowm™ network is the 3D implementation. A 3D layout can be achieved by stacking planar chips. Whereas this has been found a challenging task with modern electronics, the prospect of stacking layers of a Knowm™ network is made almost trivial by the fact that the vertical chip interconnects are the Knowm™ connections themselves. Consider the simplest case of stacking two chips. FIG. 16 illustrates a high-level diagram depicting a chip stacking system 1600 that includes vertical Knowm™ connections, in accordance with one embodiment of the present invention.

As depicted in FIG. 16, the "bottom" chip 1616 can contain all input and output neurons which is indicated pictorially by a representation of a physical neural network 1618 that includes groups of nanoconnections 1620, 1622, 1624 and so on that are disposed between electrodes while suspended within a solution as described herein. The "top" chip 1602 can be configured to contain only hidden neurons, depending of course upon design considerations. Thus, the top chip 1602 only requires a supply voltage. Other chips 1604-1614 are located between the "bottom" chip 1616 and the "top" chip 1602. In the most literal sense, the resulting Knowm™ Network can be a "synaptic sandwich". The move to the third dimension can allow for artificial neural networks capable of billions of neurons and literally thousands of trillions of connections. It can be appreciated that the configuration of system 1600 represents merely one possible embodiment of the present invention, and that alternative embodiments can be implemented which differ from system 1600 but which still fall within the scope and spirit of the claims presented herein.

If a neural circuit is configured, for example, in a 1 µm squared area, with pre-and post synaptic electrode widths of 50 nm, and 100 chips of thickness 0.1 mm stacked vertically, a network the same size and connectivity of the human brain would fit in 1 cm³. Given that transistor gate widths are on the order of 100 nm, electrodes can be patterned at sub 50 nm widths, and the technology exists to pattern VLSI structures on sub-millimeter planar chips, the only remaining task is a characterization of a nanoparticle suspension. Thus the development of a Knowm™ network should begin by first deciding on a particular neural architecture, including neural dynamics (static, dynamic, et), and a form of connection modification (supervised, unsupervised, linear, non-linear, etc). Once this is known, a nano-suspension can be found and a network can be prototyped. The incredible diversity of nanoparticles and dielectric mediums and the strong theoretical foundation provides us with a very large pool of potential solutions and a way of sorting through the many possibilities.

The Knowm™ idea is very simple. For nanoscale implementations of most neural networks, the connections must be small, modifiable and the dynamics must be slow. The connection must be "pushed", not "set". At the molecular scale, electronic signals are not slow. Indeed, the less inertia the faster the system. Thus, in order to satisfy all of these requirements, the connection must move. To create the dynamics desired at such a small scale, particles must be in a liquid. And this is one of the basic concepts of a Knowm™ Network: The dielectrophoretic assembly of nanoparticles in a solution as a mechanism to implement dynamically variable neural connections.

By taking advantage of the complex permittivity and conductivities of nanoparticle suspensions, remarkable control over a connection is possible. By appropriate choice of nanoparticle(s), dielectric solution, electrode geometry, material, and encoding mechanisms, a diverse range of neural networks can be built. These include supervised, unsupervised, pulsed, static, and genetic networks. At the same time, the physical force responsible for connection dynamics allows for the self-assembly of the connections from solution, thereby solving a major nanoscale-implementation problem.

Based on the foregoing, it can be appreciated that within the next fifteen to twenty years, the theoretical limits of photolithograph-defined circuits will be reached. As device dimensions shrink, it is no longer simply a matter of packing more transistors into a smaller space. The move requires a fundamental change in the computational paradigm, as any device will necessarily have to cope with, but more likely exploit, the quirky behavior of nanoscale systems. Along with the increase in device density is the necessity to design massively parallel and inherently fault-tolerant systems. These systems will be based on newly discovered physical phenomena, and as a result will require new design automation and fabrication technologies. In other words, the move to the nano-realm will require more than just a physical mechanism; it will require a complete infrastructure. Given this requirement, it is advantageous to design hybrid systems cable of exploiting novel physical phenomena while utilizing the existing micro-electronics manufacturing backbone.

The approach of Knowm™ physical neural network is based on the observation that applications drive the need for computational power. Many of the current unsolved problems with commercial applicability are related to real-time signal processing of massive data streams. Image segmentation, object identification, speech recognition, movement prediction and control are a few examples. Object recognition problems can be solved in distributed architectures such as neural networks, which are intrinsically solved in all moderately complex nervous systems, which are inherently fault tolerant and capable of superior performance in the face of massive amounts of noisy data. Knowm™ is a technology that bridges the gap between traditional photo-lithography-defined circuits and tomorrows self-assembled structures, allowing new computational systems to be built predominantly with current fabrication technologies.

Almost without exception, current technology fails at performing tasks most humans find effortless. Actions such as walking or driving require prodigious amounts of computation and analysis on vast quantities of noisy data. With current technology it is relatively easy to obtain massive data streams, but we cannot effectively act on this data. The ability to distinguish objects from large quantities of streaming information is absolutely critical, and currently represents a serious computational bottleneck. A hybrid CMOS/nano technology can therefore be implemented that seeks to eliminate this bottleneck and allow for the integration of truly intelligent signal processing in small, portable electronics.

The Knowm™ concept is simple, and relies on a force experienced by particles suspended in a solution and exposed to time-varying electric fields. The dielectrophoretic force can be used to attract and repel particles to an electrode gap. The electrical resistance across the gap is dependent on the relative number of nanoparticles bridging the gap: more particles, less resistance and visa versa. At a basic level, this particle bridge can be thought of as a synapse.

Biological synapses are variable, and their strengths are governed by plasticity rules. It is known that simple plasticity rules can be used to extract the Independent Components (IC) of a data set. IC's can be thought of as a mechanism for the efficient representation of an image. As an example, in a pixilated image of nothing but lines, it is considerably more useful (and efficient) to represent the image by the position and orientation of lines rather than raw pixel values. Finding the independent components of such an image would amount to extracting the lines. Stated in another way, a picture is only worth a thousand words if one recognizes objects within the picture. A front-end nano-scale processor capable of Independent Component extraction would make possible the placement of sophisticated object recognition capabilities in portable electronics.

To date, assembly and fault tolerance represent the most difficult hurdles to building nanoscale electronics. Very recent research shows that the same plasticity rules capable of extracting IC's also have the desirable property of active fault tolerance. The fixed points of the plasticity rule provide a dynamic system capable of reconfiguration of weights so as to adapt to changing environmental conditions and correct internal faults. In other words, neural circuits and weights can fail, input statistics can change, either completely or by random fluctuations, and a continually active plasticity rule will reconfigure the weights so as to repair the network. Remarkably, this fault tolerance is an added bonus, as the plasticity rule already can perform a highly desirable computation.

One example where a Knowm™ network can be applied is front-end processing for pattern classification. With Knowm™ technology, a nano-scale network can be built that self-assembles and self-repairs while extracting Independent Components from massive data streams, thereby allowing sophisticated pattern recognition technology in a small package.

The Knowm™ concept is straight forward, and considerable experimental and theoretical evidence show that such a network is not only feasible, but that it's also attainable with current technology in a relatively short time frame. Stated simply, pre- and post-synaptic neural pulses create time-varying electric fields. The relative phase of the post-synaptic pulse determines a shift in the power spectrum. Signals with more power in the lower frequency range will cause attraction of particles, while signals in the higher frequency range will cause particle repulsion. The resistance across the electrode gap is a function of particle aggregation at the gap. Thus, the connection resistance can be controlled by pre- and post-synaptic activity. The result is a nano-scale connection capable of emulating plasticity rules we know to be computationally useful and inherently fault tolerant. The algorithm is the architecture, and the architecture builds and repairs itself.

Figure 17:
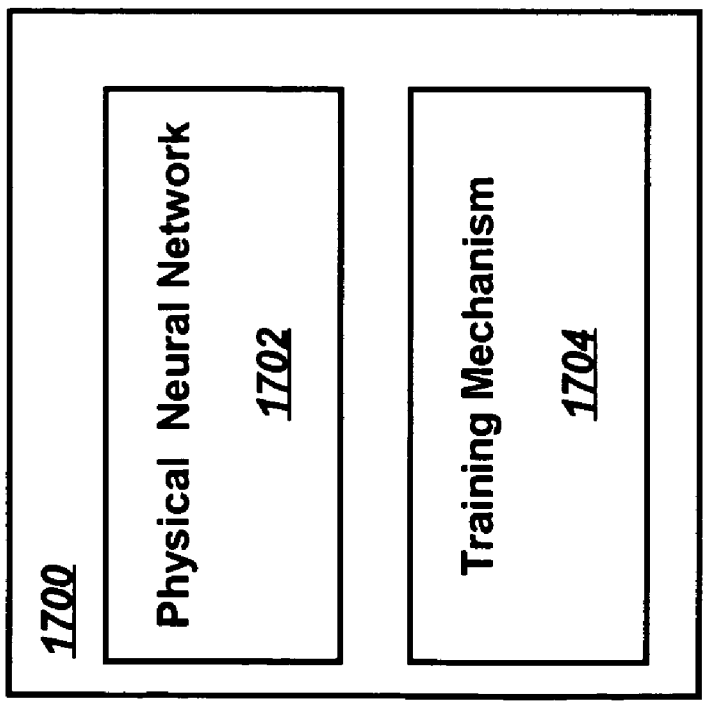
FIG. 17 illustrates a high-level block diagram depicting a system, which can be implemented in accordance with a preferred embodiment of the present invention.

FIG. 17 illustrates a high-level block diagram depicting a system 1700, which can be implemented in accordance with a preferred embodiment of the present invention. In general, system 1700 includes a physical neural network 1702, examples of which were described in greater detail herein.

System 1700 also includes a training mechanism 1704 for training physical neural network 1702 to accomplish a particular neural network task based on a neural network training rule.

Figure 18:
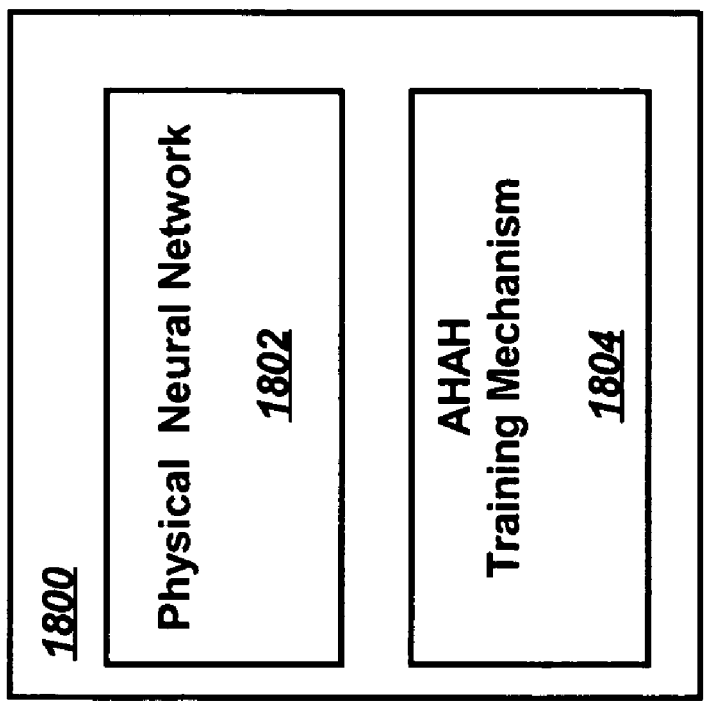
FIG. 18 illustrates a high-level block diagram depicting a system, which can be implemented in accordance with an alternative embodiment of the present invention.

FIG. 18 illustrates a high-level block diagram depicting a system 1800, which can be implemented in accordance with an alternative embodiment of the present invention. In general, system 1800 includes a physical neural network 1802, examples of which were described in greater detail herein. System 1800 also includes a training mechanism 1804 for training physical neural network 1802 to accomplish a particular neural network task based on a neural network training rule. In system 1800, training mechanism 1804 can be implemented based on the AHAH rule, which was described in greater detail herein.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A physical neural network system based on nanotechnology, comprising:
   an electromechanical-based physical neural network having at least one synaptic component, wherein said at least one synaptic component of said electromechanical-based physical neural network comprises a dielectric medium with a plurality of nanoconductors disposed in said dielectric medium;
   a mechanism for modifying a strength of said at least one synaptic component, whereby said plurality of nanoconductors suspended in said dielectric medium and free to move about are subject to a dielectrophoretic force resulting from an exposure to a time-varying electric field, wherein said dielectrophoretic force includes a dipole-induced force that is utilized to attract or repel said plurality of nanoconductors to an electrode gap formed between at least one pre-synaptic electrode and at least one post-synaptic electrode that form said at least one synaptic component of said electromechanical-based physical neural network; and
   a feedback circuit for training said electromechanical-based physical neural network by providing a feedback signal to said physical neural network for modifying said at least one synaptic component of said electromechanical-based physical neural network to accomplish a particular neural network task based on a neural network training rule, thereby permitting said electromechanical-based physical neural network to provide for a physical process capable of self-assembly and self-repair and wherein said electromechanical-based physical neural network functions as a physical mechanism that emulates said neural network training rule.

2. The system of claim 1 wherein said dielectric medium comprises a liquid dielectric solution comprising a mixture of a dielectric solvent and said plurality of nanoconductors disposed and free to move about in said liquid dielectric solution.

3. The system of claim 1 wherein said at least one synaptic component comprises at least one dynamic and modifiable connection for adaptive signal processing, wherein said at least one dynamic and modifiable connection for adaptive signal processing is formed from at least one nanoconductor among said plurality of nanoconductors within said dielectric medium.

4. The system of claim 1 wherein said neural network training rule comprises a non-supervised plasticity rule.

5. The system of claim 4 wherein said non-supervised plasticity rule comprises an Anti-Hebbian and Hebbian (AHAH) rule.

6. The system of claim 1 wherein said plurality of nanoconductors comprises charge-neutral nanoparticles suspended and free to move about in said dielectric medium.

7. The system of claim 1 wherein said at least one synaptic component comprises a dielectrophoretic assembly of said plurality of nanoconductors in said dielectric medium.

8. The system of claim 1 wherein said plurality of nanoconductors in said dielectric medium comprises semi-conducting nanoparticles.

9. The system of claim 1 wherein said plurality of nanoconductors comprises carbon nanotubes.

10. The system of claim 1 wherein said plurality of nanoconductors comprises nanowires.

11. A physical neural network system based on nanotechnology, comprising:
    an electromechanical-based physical neural network configured utilizing nanotechnology, wherein said electromechanical-based physical neural network comprises at least one synaptic component comprising a plurality of nanoconductors suspended and free to move about in a dielectric solution comprising a mixture of a dielectric solvent and said plurality of nanoconductors, wherein said plurality of nanoconductors comprises neural network connections in said dielectric solution between at least one pre-synaptic electrode and at least one post-synaptic electrode that provide said at least one synaptic component of said electromechanical-based physical neural network;
    a mechanism for dynamically implementing variable connections from said electromechanical-based neural network connections, wherein said mechanism comprises a dielectrophoretic assembly of said plurality of nanoconductors in said dielectric solution, wherein said plurality of nanoconductors suspended in said dielectric solution are subject to a dielectrophoretic force resulting from an exposure to a time-varying electric field, such that said dielectrophoretic force includes a dipole-induced force that is utilized to attract or repel said plurality of nanoconductors to an electrode gap between said at least one pre-synaptic electrode and said at least one post-synaptic electrodes; and
    a feedback circuit for training said electromechanical-based physical neural network by providing at least one feedback signal to said physical neural network for modifying said at least one synaptic component of said electromechanical-based physical neural network to accomplish a particular neural network task based on a non-supervised Anti-Hebbian and Hebbian (AHAH) rule, thereby permitting said electromechanical-based physical neural network to provide for a physical process capable of self-assembly and self-repair and wherein said electromechanical-based physical neural network functions as a physical mechanism that emulates said non-supervised AHAH rule.

12. The system of claim 11 wherein each nanoconductor among said plurality of nanoconductors suspended in said dielectric solution comprises a semi-conducting nanotube.

13. The system of claim 11 wherein each nanoconductor among said plurality of nanoconductors comprises a carbon nanotube.

14. The system of claim 11 wherein each nanoconductor among said plurality of nanoconductors comprises a nanowire.

15. A physical neural network method based on nanotechnology, comprising:
    configuring a electromechanical-based physical neural network having at least one synaptic component, wherein said at least one synaptic component of said electromechanical-based physical neural network comprises a dielectric medium with a plurality of nanoconductors disposed and free to move about in said dielectric medium, said dielectric medium comprising a dielectric solution comprising a mixture of a dielectric solvent and said plurality of nanoconductors;
    modifying a strength of said at least one synaptic component by subjecting, said plurality of nanoconductors s suspended in said dielectric medium to a dielectrophoretic force resulting from an exposure to a time—varying electric field, wherein said dielectrophoretic force includes a dipole—induced force that is utilized to attract or repel said plurality of nanoconductors to an electrode gap formed between at least one pre-synaptic electrode and at least one post-synaptic electrode that form said at least one synaptic component of said electromechanical-based physical neural network; and
    training said electromechanical-based physical neural network utilizing a feedback circuit, which provides a feedback signal to said electromechanical-based physical neural network, thereby by modifying said at least one synaptic component of said electromechanical-based physical neural network to accomplish a particular neural network task based on a neural network training rule, thereby permitting said electromechanical-based physical neural network to provide for a physical process capable of self-assembly and self-repair and wherein said electromechanical-based physical neural network functions as a physical mechanism that emulates said neural network training rule.

16. The method of claim 15 further comprising said at least one synaptic component configured to comprise at least one dynamic and modifiable connection for adaptive signal processing, wherein said at least one dynamic and modifiable connection for adaptive signal processing is formed from at least one molecular conductor among said plurality of nanoconductors.

17. The method of claim 15 wherein said neural network training rule comprises a non-supervised plasticity rule.

18. The method of claim 17 wherein said non-supervised plasticity rule comprises an Anti-Hebbian and Hebbian (AHAH) rule.

19. The method of claim 15 further comprising creating said plurality of nanoconductors from charge-neutral nanoparticles suspended and free to move about in said dielectric medium.

20. The method of claim 15 further comprising said at least one synaptic component as a dielectrophoretic assembly of said plurality of nanoconductors in said dielectric medium, wherein said dielectrophoretic assembly of said plurality of nanoconductors is suspended and free to move about in said dielectric medium.

21. The method of claim 15 further comprising constructing said plurality of nanoconductors in said dielectric medium from semi-conducting nanoparticles.

22. The method of claim 15 wherein said plurality of nanoconductors is comprised of carbon nanotubes.

23. The method of claim 15 wherein said plurality of nanoconductors is comprised of nanowires.

24. The method of claim 15 further comprising constructing said plurality of nanoconductors such that each nanoconductor among said plurality of nanoconductors conductors comprises DNA.

25. The system of claim 1 wherein each nanoconductor among said plurality of nanoconductors comprises DNA.

26. The system of claim 1 wherein each nanoconductor among said plurality of nanoconductors comprises a carbon granule.

27. The system of claim 11 wherein each nanoconductor among said plurality of nanoconductors comprises DNA.

* * * * *